US012730953B1

(12) United States Patent
Kintali et al.

(10) Patent No.: US 12,730,953 B1
(45) Date of Patent: Sep. 8, 2026

(54) SYSTEMS AND METHODS FOR DEPLOYING FRAME-BASED SIMULATION MODELS ON PROGRAMMABLE LOGIC DEVICES

(71) Applicant: The MathWorks, Inc., Natick, MA (US)

(72) Inventors: Kiran K. Kintali, Needham, MA (US); Navaneetha K. Ruthramoorthy, Ashland, MA (US); Megan N. Carpenter, Natick, MA (US)

(73) Assignee: The Math Works, Inc., Natick, MA (US)

( * ) Notice: Subject to any disclaimer, the term of this patent is extended or adjusted under 35 U.S.C. 154(b) by 627 days.

(21) Appl. No.: 18/206,491

(22) Filed: Jun. 6, 2023

Related U.S. Application Data

(60) Provisional application No. 63/349,837, filed on Jun. 7, 2022.

(51) Int. Cl.
*G06F 30/3308* (2020.01)
*G06F 117/10* (2020.01)

(52) U.S. Cl.
CPC ...... *G06F 30/3308* (2020.01); *G06F 2117/10* (2020.01)

(58) Field of Classification Search
CPC .................................................. G06F 30/3308
USPC .......................................................... 716/106
See application file for complete search history.

(56) References Cited

U.S. PATENT DOCUMENTS

| | | | |
|---|---|---|---|
| 7,275,026 B2 | 9/2007 | Mani et al. | |
| 7,882,462 B2 | 2/2011 | Ogilvie et al. | |
| 8,347,245 B2 | 1/2013 | Ogilvie et al. | |
| 8,533,642 B1 | 9/2013 | Ogilvie et al. | |
| 8,694,947 B1 | 4/2014 | Venkataramani et al. | |
| 8,745,557 B1 | 6/2014 | Venkataramani et al. | |
| 8,863,069 B1 | 10/2014 | Venkataramani et al. | |
| 9,298,862 B1 | 3/2016 | Venkataramani et al. | |
| 9,454,627 B1 | 9/2016 | Venkataramani et al. | |
| 9,817,931 B1 | 11/2017 | Gu et al. | |
| 10,248,390 B1 | 4/2019 | Venkataramani et al. | |
| 10,387,584 B1 | 8/2019 | Popovici et al. | |
| 2008/0066046 A1* | 3/2008 | Ogilvie .................. | G06F 30/30 716/108 |

OTHER PUBLICATIONS

Bravhar, Klemen, et al., Implementation of Vision Algorithms on BRAVE FPGA's Developed in MATLAB and VHDL Environment, The MathWorks, Inc., European Space Agency, ESA, Sep. 4, 2018, pp. 1-20.

Draper, Bruce A., et al., "Accelerated Image Processing on FPGAs1", Dec. 2003, pp. 1-9.

"EECS150: Interfaces: "FIFO" (a.k.a. Ready/Valid)," UC Berkeley Collage of Engineering, Department of Electrical engineering and Computer Science, Feb. 2009, pp. 1-5.

(Continued)

*Primary Examiner* — Eric D Lee

(74) *Attorney, Agent, or Firm* — Cesari and McKenna, LLP

(57) ABSTRACT

Systems and methods transform frame-based algorithms into revised algorithms having the same behavior as the frame-based algorithms, but that can be synthesized in hardware. The frame-based algorithm may be represented by an executable simulation model, such as a block diagram model.

11 Claims, 32 Drawing Sheets

(56) References Cited

OTHER PUBLICATIONS

"HDL Coder™ User's Guide," MATLAB®&SIMULINK®, R2022a, The MathWorks, Inc., Mar. 2022, pp. 1-2676.

Hoozemans, et al., "Frame-Based Programming, Stream-Based Processing for Medical Image Processing Applications," Springer, Journal of Signal Processing Systems, vol. 91, Jan. 4, 2019, pp. 47-59.

Jeong, Seunghyuk "FPGA ASIC: Efficient Algorithm Targeting Creation Method and Introduction of New Features," MATLAB EXPO 2018, The MathWorks, Inc., May 2018, pp. 1-32.

Ouedraogo, Ganda Stephane, et al., "Frame-Based Modeling for Automatic Synthesis of FPGA-Software Defined Radio," 2014 $9^{th}$ International Conference on Cognitive Radio Oriented Wireless Networks (CROWNCOM), ICST, IEEE, Oulu, Finland, Jun. 2-4, 2014, pp. 341-346.

Saidani, Taoufik, et al., "Hardware Acceleration of Video Edge Detection with Hight Level Synthesis on the Xilinx Zynq Platform," Engineering, Technology & Applied Science Research, ETASR, vol. 12, No. 1, Feb. 2022, pp. 8007-8012.

Sharma, Hitu, "Adopting Model-Based Design for FPGA, ASIC, and SoC Development," MATLAB EXPO 2019, The MathWorks, Inc., Apr. 2019, pp. 1-28.

"Simulink® User's Guide", MATLAB®&SIMULINK®, R2023a, The MathWorks, Inc., Mar. 2023, pp. 1-4510.

* cited by examiner

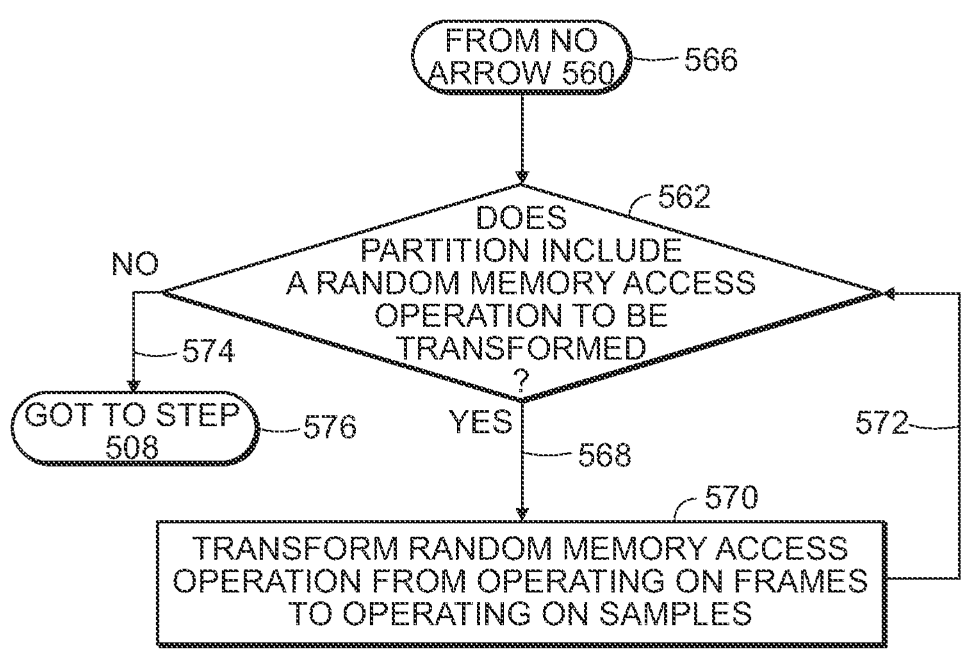
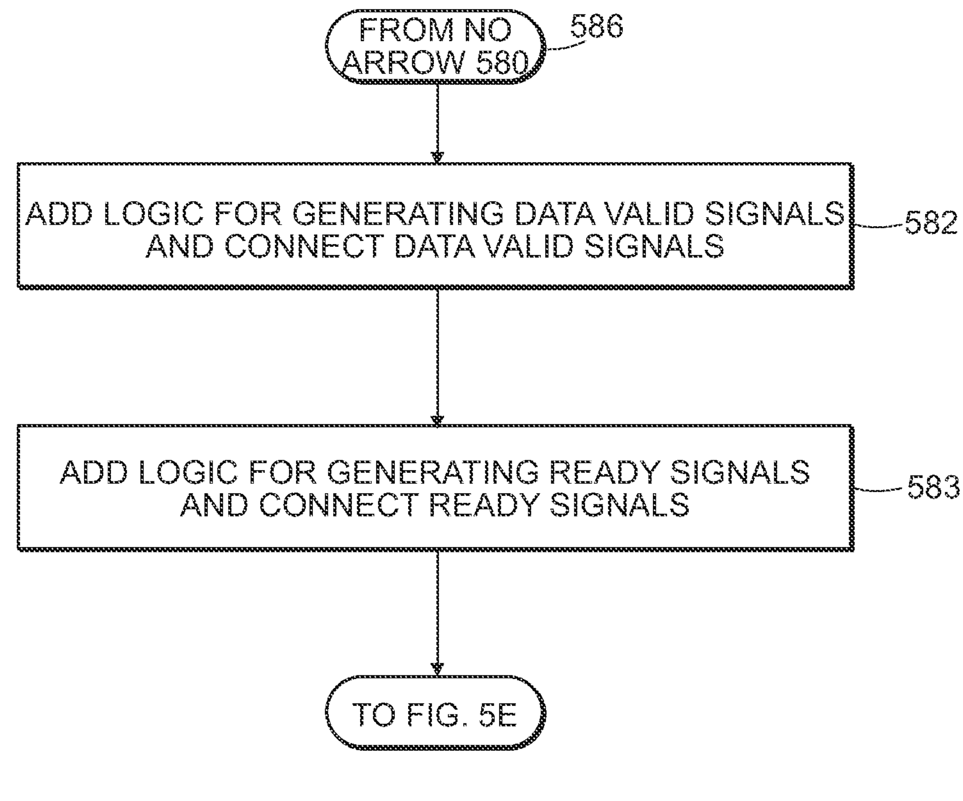
FIG. 5D

1100

```
function [Rout, Gout, Bout] = fog_stage2(im_gray_single, r, g, b);

% FOG RECTIFICATION STAGE2
% histogram computation
% Find cdf
% Find breakpoints of table
% Compute table
% Use table on input image to create output image

im_gray = unit8(im_gray_single);

% histogram calculation
hist = zeros(1, 256, 'unit32'):
hist = hdl.iteratorfun(@hist_kernel_fcn, im_gray, hist);

cdf_init = zeros(256,1,'uint32');
cdf  = hdl.iteratorfun(@cdf_compute, hist, cdf_init);

N = numel(im_gray);
p1 = fi(5*N/100);
p2 = fi(N-(5*N/100));

i1i2 = zeros(1,2, 'uint8');
i1i2 = hdl.iteratorfun(@find_break_points, cdf, i1i2, p1, p2);
i1 = i1i2(1);
i2 = 255-i1i2(2);

o1 = fi(255*0.10,32,16, 'RoundingMethod','Zero', OverflowAction','Saturate');
o2 = fi(255*0.90,1,32,16, 'RoundingMethod','Zero', OverflowAction','Saturate');

t1 = o1/fi(i1, 'RoundingMethod','Zero', .'OverflowAction','Saturate');
t2 = (o2-o1)/fi(i2-i1, 'RoundingMethod','Zero', .'OverflowAction','Saturate');
t3 = (255-o2)/fi(255-i2, 'RoundingMethod','Zero', 'OverflowAction','Saturate');

t1f = fi(t1, 0, 32, 24);
t2f = fi(t2, 0, 32, 24);
t3f = fi(t3, 0, 32, 24);

T = zeros(1,256, 'uint8');
T = hdl.iteratorfun(@createTable, T, T, i1, i2, t1f, t2f, t3f, o1, 02);

[Rout, Gout, Bout] = hdl.npufun(@table_lookup, [1,1], r, g, b, 'KernelArg',
T);

end

function count = hist_kernel_fcn(pix, count, idx) %#ok<*INUSD>

count(pix+1) = count(pix+1) +1;

end
```

```
function cdf = cdf_compute(hist, cdf, idx)

 if idx > 1
      cdf(idx) = cdf(idx-cast(1, 'like' ,idx)) + hist;
 else
      cdf(1) = hist;
 end

end

function i1i2 = find_break_points(cdf, i1i2, idx, p1, p2)
      if (cdf <= p1)
           i1i2(1) = i1i2(1) + 1;
      end

      if (cdf >= p2)
           i1i2(2) = i1i2(2) + 1;
      end
end

function T = createTable(unused, T, idx, i1, i2, t1f, t2f, t3f, o1, o2)

      is = uint16(idx);
      if is <= i1+1
           T(idx) = uint8(t1f*(is-1));
       elseif is >= i1+2 && is <= i2+1
           T(idx) = uint8(((t2f)*(is-1)) - ((t2f)*i1)+o1);;
       else
           T(idx) = uint8(((t3f*(is-1)) - ((t3f)*i2)+o2);;
       end

end

function [r_out, g_out, b_out] = table_lookup(r, g, b, T)
     out1=T( r );
     out2=T( g );
     out3=T( b );

      r_out = uint8(out1);
     g_out = uint8(out2);
     b_out = uint8(out3);
end
```

FIG. 11B

SYSTEMS AND METHODS FOR DEPLOYING FRAME-BASED SIMULATION MODELS ON PROGRAMMABLE LOGIC DEVICES

CROSS-REFERENCE TO RELATED APPLICATIONS

This application claims the benefit of U.S. Provisional Patent Application Ser. No. 63/349,837, filed Jun. 7, 2022, by Kiran K. Kintali et al. for Systems and Methods for Deploying Frame-Based Models on Programmable Logic Devices, which application is hereby incorporated by reference in its entirety.

BRIEF DESCRIPTION OF THE DRAWINGS

The description below refers to the accompanying drawings, of which:

FIGS. 5A-G are partial views of a flow diagram of an example method for transforming a frame-based model into a format suitable for generation of HDL code in accordance with one or more embodiments;

FIGS. 11A-B are partial views of an example a listing of source code in accordance with one or more embodiments;

DETAILED DESCRIPTION OF ILLUSTRATIVE EMBODIMENTS

Figure 1:
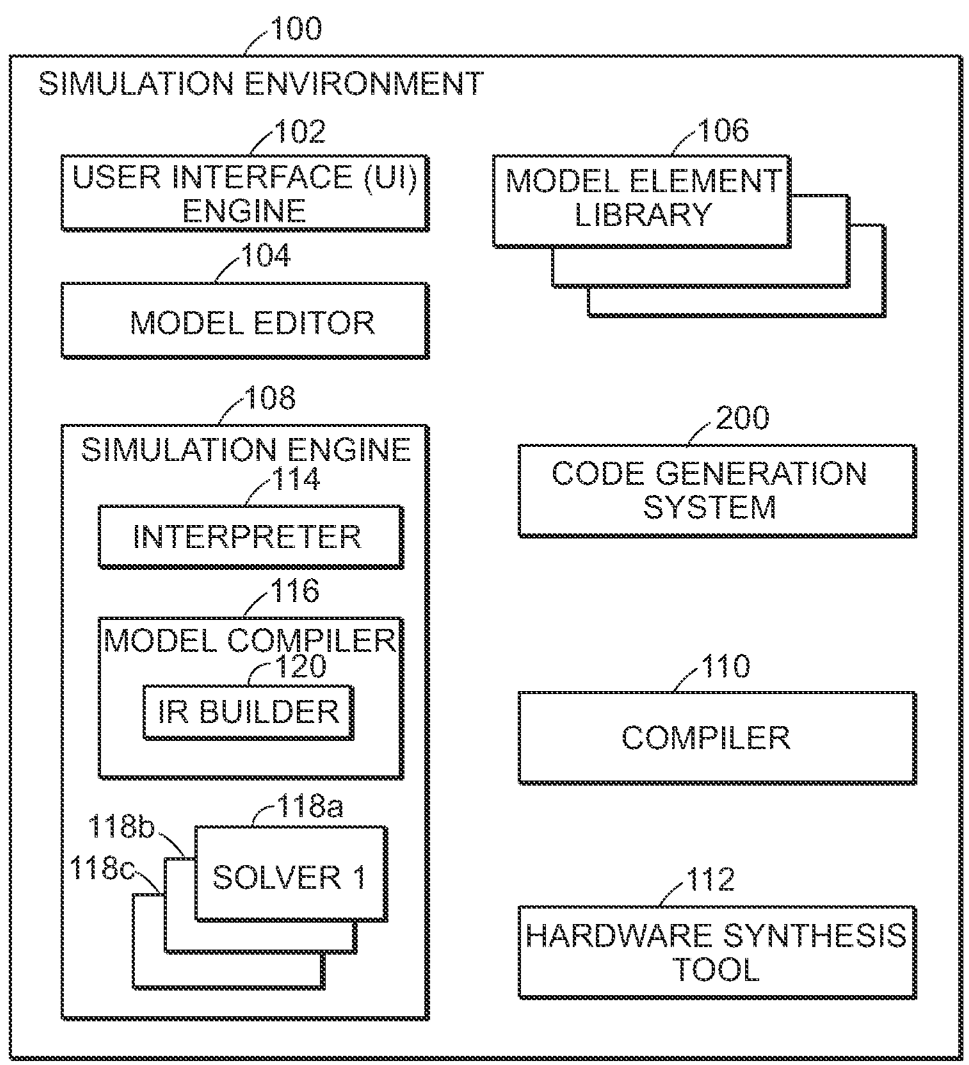
FIG. 1 is a schematic, functional illustration of an example simulation environment in accordance with one or more embodiments.

For image processing and other applications, users typically create computer programs, e.g., algorithms, that operate on input data that is in the form of frames. A frame may consist of data elements organized as an array, such as a matrix having data elements organized in rows and columns. Frame-based data is a common format for real-time applications. For the R and Python programming languages, a frame may be a table-like data structure. A frame-based program or algorithm may receive, process, and/or output frames. Sometimes, the input and output frames may be quite large. For example, the frames of a high definition, e.g., 4*k*, video stream may consist of pixels in a 3840×2160 array, and each pixel may be 8 bytes. For purposes of the present disclosure, the data elements of the frame may all be acquired at and/or associated with the same moment in time, e.g., the same time instant, or they may be accumulated over time. For example, the data elements, e.g., pixels, of each frame of a video file or stream or of an image file may all be associated with the same instant in time. In addition to image processing, other frame-based applications include radar applications, digital signal processing applications, and audio processing among others.

The user may develop the algorithm in an integrated development environment that supports frame-based, e.g., matrix, processing. For example, the MATLAB® development environment and the Simulink® simulation environment both include predefined frame-based primitives, e.g., MATLAB functions and Simulink blocks, that perform frame-based, e.g., matrix, operations. Frame-based functions and blocks process an entire frame, e.g., matrix, at each execution of the frame-based function or block.

While it is often faster and more convenient for users to design programs or algorithms using frame-based functions and blocks operating on large frames, e.g., 240×320 or greater, once the program or algorithm is created, the user may wish to deploy the frame-based algorithm to a programmable logic device, such as a Complex Programmable Logic Device (CPLD), a Field Programmable Gate Array (FPGA), or an Application Specific Integrated Circuit (ASIC), for execution. Programmable logic devices have Input/Output (IO) pins on which input data is received by the device for processing and on which output data generated by the device is made available, e.g., for storage and/or processing by one or more other devices or components. FPGAs, for example, may have anywhere from a few hundred to a few thousand IO pins. To input an entire frame of a 4 k video stream, however, an FPGA would need several million pins. Such FPGAs do not currently exist.

Redesigning a frame-based algorithm operating on large frames so that it is suitable for execution by a programmable logic device is difficult, time-consuming, and error-prone, especially for users who are not experts in hardware programming. For example, it could take a user many months to implement a short a frame-based algorithm having calls to frame-based functions operating on large frames into a form from which synthesizable Hardware Description Language (HDL) code can be generated, deployed to, and run on a programmable logic device.

In particular, to deploy a frame-based algorithm to a programmable logic device, a user must rewrite the frame-based algorithm in a form that is compatible with the target programmable logic device. For example, the new algorithm must be written to meet the limited IO and other resources available on the programmable logic device. Typically, the user must convert the frame-based algorithm into a form that implements the same functionality as the original frame-based algorithm but that operate on one or more streams of data, e.g., pixels, and are within the IO and other resource constraints of the device. Where the frame-based algorithm processed large input frames and generated large output frames, the new form of the algorithm receives samples, e.g., pixels, processes the samples, and generates output samples, e.g., pixels, which must then be reassembled to construct the desired output frames. More specifically, the user must revise the frame-based algorithm to serialize the input and output to be one sample or a small number of samples to meet the device's pin and other resource requirements. Furthermore, while a frame-based algorithm may receive and process an entire frame, and can thus access any random element, e.g., pixel, from the frame based on its XY coordinates, for any practical application, an FPGA lacks sufficient resources, e.g., IO pins, block Random Access Memory (BRAM), etc. to receive and store an entire frame. Accordingly, the user must determine how much and which pixels of the frame-based input data to store on the device or load from a memory external to the device before processing, as well as the particular on-device storage element to use, such as BRAMs, First-In-First-Out memories (FIFOs) or Registers. In some cases, the user may also need to create flow control signals, such as valid/ready handshakes, to prevent data from being lost and/or stale data from being processed. A valid signal indicates that a data source has put valid data on a data line. A ready signal indicates that a data sink is ready to receive new data. The user will also need to identify data streams in the new form of the algorithm that become out of alignment and determine the data buffering requirements needed to bring them into alignment. The user will also need to determine whether selected on-device logic driving the sample data and consuming the sample data are sufficient. The user must also revise the frame-based algorithm to provide sufficient storage to buffer input and output data on the programmable logic device. These are just some of the complicated and error-prone tasks that must be performed.

Briefly, the present disclosure relates to computer-based systems and methods for transforming a frame-based algorithm into a sample-based algorithm having the same behavior as the frame-based algorithm. The term sample-based algorithm means an algorithm that processes scalars, vectors or frames (that are smaller as compared to the large, e.g., 240×320 or greater, frames processed by the frame-based algorithm) and from which synthesizable code can be generated that can be deployed and run on a programmable logic device. Sample-based algorithms may process a few samples at a time, such as one pixel or one to five pixels for an image processing algorithm as an example. For example, the total size in bits may be less than 5000, such as a 25×25 matrix of unsigned 8-bit integer values. In some embodiments, the total size in bits may be much less, such as 1000 or less, e.g., to meet the IO pin count of the target programmable logic device. In some embodiments, the frame-based algorithm may be a textual or graphical program, e.g., an executable simulation model, and may include frame-based primitives, such as frame-based functions and/or blocks. The systems and methods may analyze a frame-based algorithm and make hardware design choices based on the particular algorithm and the particular target hardware device. The systems and methods may add logic for storing samples on the device, aligning data streams, and balancing data paths. The systems and methods also may add valid and ready flow control signals in addition to the stream-based data signals.

The user may provide the following inputs to the systems and methods: the frame-based algorithm; the number of frame elements, e.g., samples, that are processed per cycle of execution of the frame-based algorithm, the type and size of on-device storage elements to be used to store input data elements from the input frames and output data elements computed by the frame-based algorithm, such as First-In-First-Out (FIFO) memories, block Random Access Memories (BRAMs), or Registers; and the ports or variables of the frame-based algorithm that are to be converted to samples as part of the transformation.

The systems and methods may analyze and partition the frame-based algorithm into partitions, e.g., slices of logic, based on data dependencies. For example, each partition may be interconnected by data dependencies. The systems and methods may transform each partition of the frame-based algorithm into a sample-based algorithm that meets the constraints of the target hardware device. For each partition, the systems and methods may change the datatypes and the sample rate of the data processed in each partition based on the structure and characteristics of the target hardware device. The systems and methods also may identify the types of frame-based operations performed by the partition being auto-transformed. Exemplary frame-based operation types include elementwise, neighborhood, reduction, structured access, and random access.

In some embodiments, a user may indicate that one or more operations of the frame-based algorithm, e.g., within a given partition, operate on a window of a certain size, e.g., a 3×3 window, a 5×5 window, etc. The systems and methods may identify the boundaries of the portion of the frame-based algorithm operating on the identified windows. For portions of the frame-based algorithm operating on windows, the systems and methods may design and insert line buffers in order to hold enough prior samples to produce a window of the correct size. The systems and methods may also design and insert logic which applies boundary conditions to the portions of the window which are outside of the frame. The systems and methods also may determine how much additional processing time window-generation operations will take, and design and insert scheduling logic in order to account for this additional processing time. If multiple outputs from a particular windowing region are required, the systems and methods may automatically duplicate the logic within the windowing region to produce the multiple outputs. The systems and methods may design and insert logic to modify an output valid signal in relation to an input valid signal, e.g. a valid input sample may not produce a valid window on the same cycle, and, conversely, a cycle on which the windowing region receives an invalid input sample may still be a cycle on which a valid window is produced. If the systems and methods identify multiple windowing regions in the frame-based algorithm which act on the same input data, the systems and methods may reuse existing line buffers in order to reduce the total number of line buffers used, even if the windowing regions have different sizes.

The systems and methods may apply a predetermined transformation solution for the type of frame-based operation(s) performed by the partition. Each transformation solution may include designing and adding line buffers, scheduling logic, and state machines. Each transformation solution also may include designing and adding valid and ready flow control signals to the partition. For example, the systems and methods may design and include logic that permits computation of output data elements or the storage of output data elements only when the valid signal input to the partition is set to valid. The systems and methods also include design and logic that sets the valid signal output by the partition to valid when the partition has completed its computation, e.g., of output data elements. The systems and methods also design and include logic that generates a ready signal when a component of a partition can accept new data for processing. The transformation solutions applied by the systems and methods also may involve designing and inserting new logic within a partition, where the new logic is not merely a translation of existing operations of the frame-based algorithm.

The systems and methods may design and add input/output buffers to each partition for buffering input data to be processed by the partition and for buffering output data computed by the partition. The systems and methods also may add logic connecting the ready signals to the input/output buffers.

The systems and methods may design and insert alignment logic between partitions that interact with each other. The systems and methods may determine which input pins will provide input data to the various partitions and which output pins will provide output data computed by the various partitions.

Once all of the partitions have been transformed to a sample-based algorithm, the systems and methods may optionally generate an executable validation model. The validation model and the user's frame-based model may be included in a test bench environment to evaluate whether, e.g., verify that, the outputs computed by the validation model match outputs computed by the frame-based model.

The systems and methods may generate code, e.g., Hardware Definition Language (HDL) code, from the sample-based algorithm generated by transforming the original frame-based algorithm. The systems and methods may utilize the generated HDL code to configure a programmable logic device to perform the sample-based algorithm. In some embodiments, the systems and methods may generate HDL code from the sample-based logic and deploy the HDL to test hardware to support Hardware-in-the-Loop (HIL) testing. By utilizing the computer-based systems and methods of the present disclosure, implementing a frame-based algorithm in a target hardware device and verifying its behavior, which previously requirement months of effort, can now be achieved in a matter of minutes or hours.

Simulation Environment

FIG. 1 is a schematic, functional illustration of an example simulation environment 100 in accordance with one or more embodiments. The simulation environment 100 may include a User Interface (UI) engine 102, a model editor 104, one or more model element libraries indicated at 106, a simulation engine 108, a code generation system 200, a compiler 110, and a hardware synthesis tool 112. The UI engine 102 may create and present one or more User Interfaces (UIs), such as Graphical User Interfaces (GUIs) and/or Command Line Interfaces (CLIs), on a display of a workstation or other data processing device. The UIs may be operated by a user to initiate model-related tasks, such as opening, constructing, revising, and saving simulation models, among others. The model editor 104 may perform selected operations on a simulation model in response to user inputs. The model element libraries 106 may include predefined model element types, and the model editor 104 may create a simulation model, e.g., by including and arranging instances of selected model element types in the model, for example, in response to user interaction with the simulation environment 100. The model editor 104 also may establish relationships, such as connections, among the model elements, for example in response to user input connecting particular model elements. Model elements may represent dynamic systems, computations, functions, operations, data stores, events, states, state transitions, etc., and the connections, may represent data, control, signals, events, mathematical relationships, state transitions, physical connections, etc.

In some cases, a group of model elements, such as blocks, may be contained within another element or block, thereby establishing hierarchy or layers in a model. The group of blocks may be visually presented within the model as a single block at a first layer of the model. The single block may be opened presenting a second layer of the model revealing the group of blocks contained in the single block. A single block that contains other blocks may be referred to as a hierarchical block. Exemplary hierarchical blocks include subsystem and submodel blocks of the Simulink® model-based design environment, Virtual Instruments (VIs) of the Lab VIEW programming system, and SuperBlocks of the MatrixX modeling environment, among others. While hierarchical blocks may help organize a model and simplify its graphical presentation, some types of hierarchical blocks may play no active role in the simulation of the model and may be referred to as virtual blocks. Model elements that do play an active role in the simulation of a model, including other types of hierarchical blocks, may be referred to as non-virtual blocks. A hierarchical block may itself contain one or more other hierarchical blocks, thereby establishing multiple layers or hierarchal levels in a model. Hierarchical blocks, which also may be referred to as components, may include input ports and output ports, and input/output dependencies may extend across hierarchical levels of a model. In some embodiments, a hierarchical block may also be saved and reused in other models.

The simulation engine 106 may include an interpreter 114, a model compiler 116, and one or more solvers, such as solvers 118*a-c*. The model compiler 116 may include one or more Intermediate Representation (IR) builders, such as IR builder 120. Models created by the simulation environment 100 may be executable simulation models, such as block diagram models. The simulation engine 108 may execute, e.g., compile and run or interpret, a model using one or more of the solvers 116*a-c*, which may compute numerical solutions for the model. Exemplary solvers include one or more fixed-step continuous solvers, which may utilize integration techniques based on Euler's Method or Heun's Method, and one or more variable-step solvers, which may be based on the Runge-Kutta and Dormand-Prince pair. A non-exhaustive description of suitable solvers may be found in the *Simulink User's Guide* from The Math Works, Inc. (March 2023 ed.)

The code generation system 200 may generate code for a simulation model or portion thereof automatically. The generated code may be in the form of Hardware Description Language (HDL) code for use in synthesizing one or more programmable logic devices. In some embodiments, the generated code may be source code or object code suitable for execution outside of the modeling environment 100, and may be referred to as standalone code. To the extent the generated code is source code, the compiler 108 may compile the source code into object code for execution by a target computer platform. In addition to generating HDL, the code generation system 200 may generate source code conforming to a selected programming language, such as the Cor C++ programming languages.

Exemplary simulation environments that may be extended by the present disclosure include the Simulink® model-based design environment, the Simscape physical modeling system, and the Stateflow® state chart tool all from The Math Works, Inc., the MapleSim physical modeling and simulation tool from Waterloo Maple Inc. of Waterloo, Ontario, Canada, the LabVIEW virtual instrument programming system and the NI MatrixX model-based design product from National Instruments Corp. of Austin, TX, the Keysight VEE graphical programming environment from Keysight Technologies, Inc. of Santa Clara, CA, the System Studio model-based signal processing algorithm design and analysis tool and the SPW signal processing algorithm tool from Synopsys, Inc. of Mountain View, CA, a Unified Modeling Language (UML) system, a Systems Modeling Language (SysML) system, and the System Generator system from Xilinx, Inc. of San Jose, CA.

The Simulink® model-based design environment is a block diagram-based design environment for modeling and simulating dynamic systems, among other uses. The Simulink® model-based design environment together with the MATLAB algorithm development environment provide a number of high-level features that facilitate algorithm development and exploration, and support model-based design, including dynamic typing, array-based operations, data type inferencing, sample time inferencing, and execution order inferencing, among others. With the Simulink® model-based design environment, some predefined blocks can be configured to interpret matrices processed by the block as samples or as frames. In sample-based processing mode, the block interprets (i) each element of the matrix as one sample in a distinct channel and (ii) all elements as having been acquired at or being associated with the same time instant. In frame-based mode, the block interprets (i) the columns of the matrix as different channels and (ii) the rows as samples acquired or associated at different time instants, e.g., sequential and consecutive time instants that have been accumulated.

For the present disclosure, however, the term frame-based algorithm refers to a model that processes matrices or vectors for which synthesizable HDL cannot be generated because it would exceed the IO or other resources available at the target programmable logic device. Furthermore, a frame of a frame-based algorithm may include elements acquired at or associated with the same time instant or the frame may include elements accumulated over multiple time instants, consecutive or otherwise. Furthermore, the term sample-based algorithm refers to a form of the original frame-based algorithm that meets the resource limitations of the programmable logic device, e.g., IO pins, and from which synthesizable HDL code can be generated and deployed to and run by the programmable logic device. For example, a sample of a sample-based algorithm may be a scalar, vector, and/or frame, that is smaller than the frames of the frame-based algorithm. Smaller may refer to fewer data elements (or bits) than the frame of the frame-based algorithm. Furthermore, a frame-based model or DUT that is transformed by the frame transformation system 208 as described herein may include one or more blocks configured for sample-based processing mode and/or one or more blocks configured for frame-based processing mode.

In some embodiments, a simulation model may be a time-based block diagram. A time-based block diagram may include, for example, model elements, such as blocks, connected by lines, e.g., arrows, that may represent signal values written and/or read by the model elements. A signal is a time varying quantity that may have a value at all points in time during execution of a model, for example at each simulation or time step of the model's iterative execution. A signal may have a number of attributes, such as signal name, data type, numeric type, dimensionality, complexity, sample mode, e.g., sample-based or frame-based, and sample time. The model elements may themselves consist of elemental dynamic systems, such as a differential equation system, e.g., to specify continuous-time behavior, a difference equation system, e.g., to specify discrete-time behavior, an algebraic equation system, e.g., to specify constraints, a state transition system, e.g., to specify finite state machine behavior, an event based system, e.g., to specify discrete event behavior, etc. The connections may specify input/output relations, execution dependencies, variables, e.g., to specify information shared between model elements, physical connections, e.g., to specify electrical wires, pipes with volume flow, rigid mechanical connections, etc., algorithms, e.g., to be applied to an input, an output, a value, etc., or the like.

In a time-based block diagram, ports may be associated with model elements. A relationship between two ports may be depicted as a line, e.g., a connector line, between the two ports. Lines may also, or alternatively, be connected to other lines, for example by creating branch points. A port may be defined by its function, such as an input port, an output port, an enable port, a trigger port, a function-call port, a publish port, a subscribe port, an exception port, an error port, a physics port, an entity flow port, a data flow port, a control flow port, etc.

Relationships between model elements may be causal and/or non-causal. For example, a model may include a continuous-time integration block that may be causally related to a data logging block by depicting a connector line to connect an output port of the continuous-time integration block to an input port of the data logging model element. Further, during execution of the model, the value stored by the continuous-time integrator may change as the current time of the execution progresses. The value of the state of the continuous-time integrator block may be available on the output port and the connection with the input port of the data logging model element may make this value available to the data logging block.

In some implementations, a model element may include or otherwise correspond to a non-causal modeling function or operation. An example of a non-causal modeling function may include a function, operation, or equation that may be executed in different fashions depending on one or more inputs, circumstances, and/or conditions. A non-causal modeling function or operation may include a function, operation, or equation that does not have a predetermined causality.

The simulation environment 100 may implement a graphical programming language having a syntax and semantics, and models may be constructed according to the syntax and semantics defined by the simulation environment 132.

Exemplary code generators that may be extended by the present disclosure include the HDL Coder, the Simulink Coder, the Embedded Coder, and the Simulink PLC Coder products from The Math Works, Inc., and the TargetLink product from dSpace GmbH of Paderborn Germany, among others.

A simulation model may be a graphical, textual, or combination graphical/textual model. Suitable models include Simulink models, Stateflow charts, LabVIEW block diagrams, MatrixX models, Agilent VEE diagrams Modelica models from the Modelica Association, Uniform Modeling Language (UML) models, and Systems Modeling Language (SysML) models, among others.

Code Generation System

Figure 2:
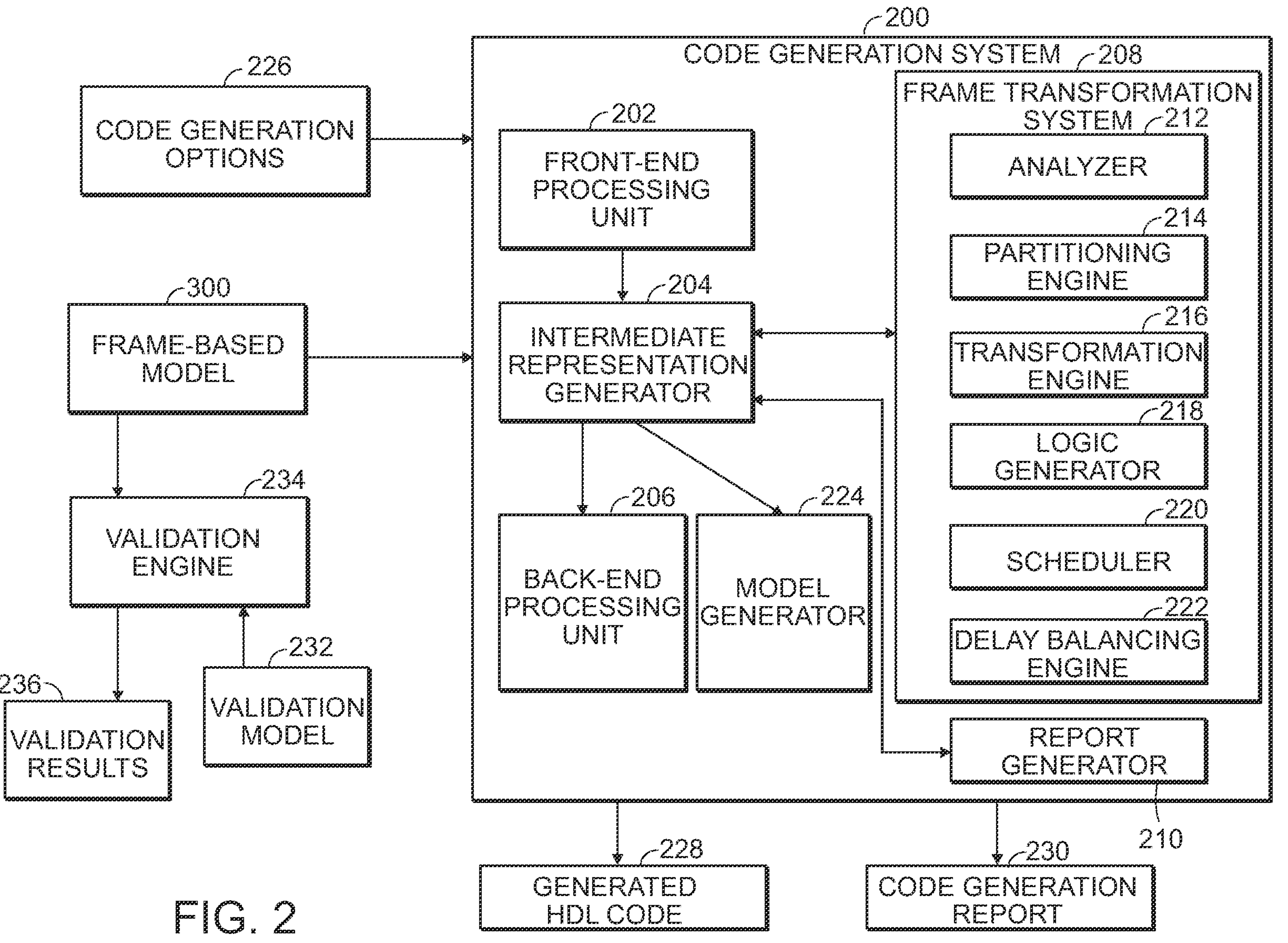
FIG. 2 is a schematic illustration of an example of a code generation system in accordance with one or more embodiments.

FIG. 2 is a schematic illustration of an example of the code generation system 200 in accordance with one or more embodiments. The code generation system 200 may include a front-end processing unit 202, an intermediate representation (IR) generator 204, a back-end processing unit 206, an optimization engine 208, and a report generator 210. The optimization engine 208 may include an analyzer 212, a partitioning engine 214, a transformation engine 216, a logic generator 218, a scheduler 220, and a delay balancing engine 222. In some embodiments, the code generation system 200 also may include a model generator 224.

It should be understood that the code generation system 200 may utilize the IR builder 118 of the model compiler 114 to construct and modify one or more in-memory intermediate representations (IRs) for a model, rather than having its own IR generator 204.

The code generation system 200 may access a frame-based simulation model 300 or portion thereof. The code generation system 200 also may receive one or more code generation options 226. The code generation system 200 may generate HDL code 228 corresponding to the frame-based model 300. The generated HDL code 228 may be bit true and cycle accurate (modulo a well-defined initial latency) to the frame-based model 300. Exemplary HDL code that may be generated includes VHDL code, Verilog code, SystemC code, and vendor or target specific HDL code, such as Xilinx FPGA libraries. The generated HDL code 228 may be output in the form of a build or other file. In some embodiments, the code generation system 200 may generate embedded MATLAB code. The report generator 210 may produce one or more code generation reports 230, such as a hardware resource utilization report and/or a timing diagram.

The model generator 224 may produce a validation model 232 that corresponds to the generated HDL code 228. The frame-based model 300 and the validation model 232 may be received by a validation engine 234, which may be part of the modeling environment 100. The validation engine 234 may compare outputs computed by the frame-based model 300 with outputs computed by the validation model 232, and may generate validation results 236. A user may evaluate the validation results 236 to determine whether the behavior of the validation model 232 (and therefore the behavior of the generated HDL code 228) is equivalent to the behavior of the frame-based model 300.

The code generation system 200 and/or its one or more of its components may be implemented through one or more software modules or libraries containing program instructions that perform the methods described herein, among other methods. The software modules may be stored in one or more memories, such as a main memory, a persistent memory, and/or a computer readable media, of a data processing device, and may be executed by one or more processors. Other computer readable media may also be used to store and execute these program instructions, such as one or more non-transitory computer readable media, including optical, magnetic, or magneto-optical media. In other embodiments, the code generation system 200 or portions thereof may be implemented in hardware, for example through hardware registers and combinational logic configured and arranged to produce sequential logic circuits that implement the methods described herein. In other embodiments, various combinations of software and hardware, including firmware, may be utilized to implement the systems and methods of the present disclosure.

The frame-based model 300, the code generation options 226, the generated HDL code 228, the code generation report 230, the validation model 232, and the validation results 236 may be implemented through one or more data structures, such as files, objects, linked lists, etc., stored in one or more computer memories of a data processing device.

FIGS. 1 and 2 are intended for illustrative purposes and the present disclosure may be used with other simulation environments and/or code generation systems, e.g., having additional, fewer, or other components. For example, in some embodiments, the code generator system 200 may be a separate application or module relative to the simulation environment 100.

For purposes of explanation, portions of the present disclosure make reference to model elements, such as blocks, of the Simulink® modeling environment from The MathWorks, Inc. This is not intended as limiting. The present disclosure may be used with other simulation and/or modeling environments supporting other elements.

Frame-Based Simulation Model

Figure 3:
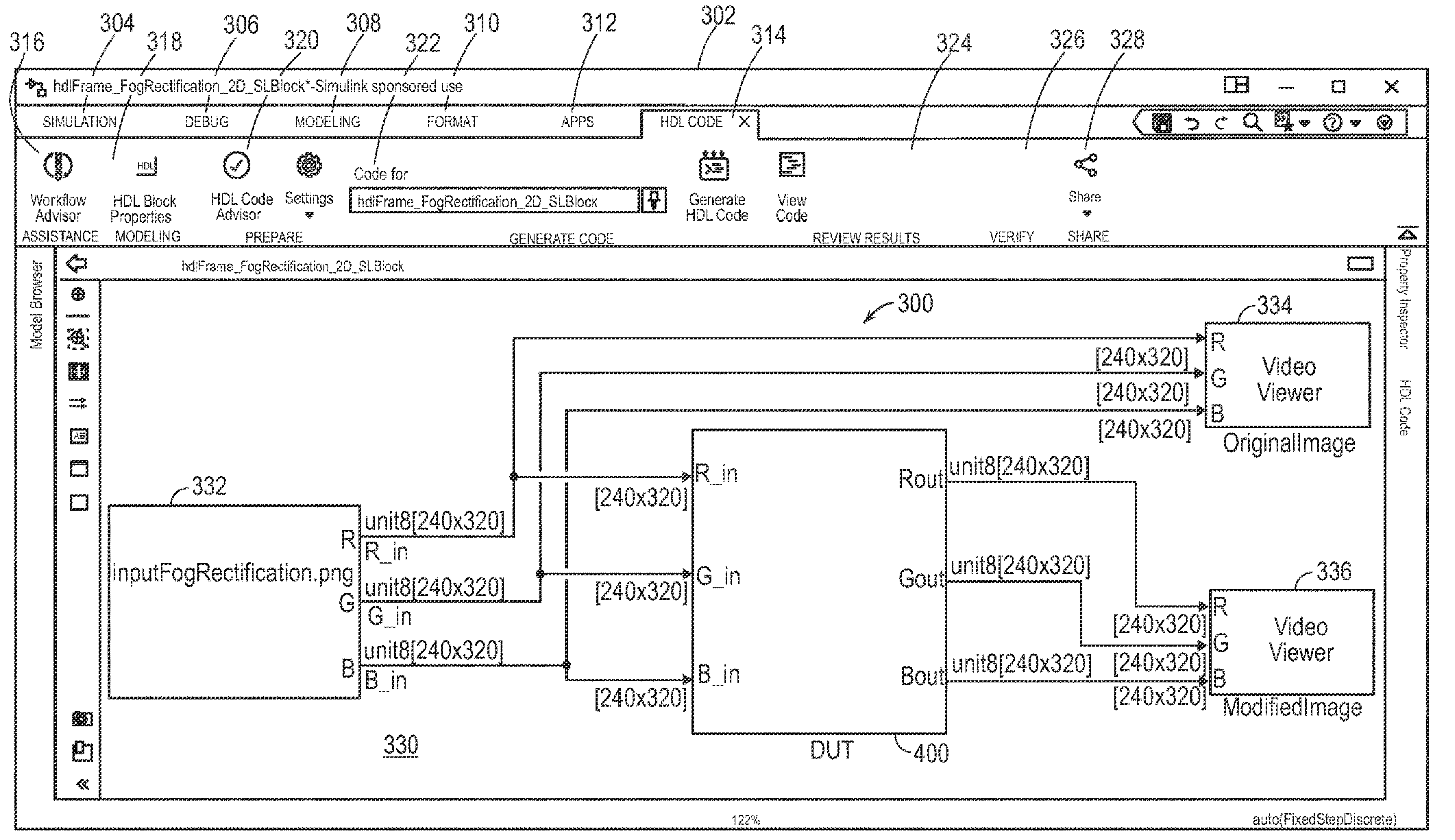
FIG. 3 is an illustration of an example of a frame-based simulation model in accordance with one or more embodiments.

FIG. 3 is an illustration of an example of the frame-based model 300 in accordance with one or more embodiments. The frame-based model 300 may be presented in a model editor window 302. The model editor window 302 may include user interface elements, such as widgets, buttons, and other graphical affordances, allowing a user to open, construct, edit, run, and save the frame-based model 300. For example, the model editor window 302 may have a plurality of tabs, such as a 'Simulation' tab 304, a 'Debug' tab 306, a 'Modeling' tab 308, a 'Format' tab 310, an 'Apps' tab 312, and an 'HDL Coder' tab 314. Each tab may have a respective toolstrip with command buttons associated with the respective tab. In FIG. 3, the 'HDL Coder' tab 314 is selected. The commands associated with the 'HDL Coder' tab 314 may be organized into subtabs, such as an 'Assistance' subtab 316, a 'Modeling' subtab 318, a 'Prepare' subtab 320, a 'Generate Code' subtab 322, a 'Review Results' subtab 324, a 'Verify' subtab 326, and a 'Share' subtab 328. The 'Simulation' tab 304, if selected, may include a Run button (not shown), among other command buttons. In response to selection of the Run button, the simulation engine 106 may run, e.g., execute, the model 300 as described herein.

The model editor window 302 also may include a canvas 330 and a visual depiction of the frame-based model 300 may be presented on the canvas 330. The frame-based model 300 may model a fog rectification algorithm, which is intended to remove fog from images captured by a camera under foggy conditions. The process of fog rectification can be an important preprocessing step for autonomous driving and object recognition applications. Without fog rectification, images captured in foggy and hazy conditions often exhibit low visibility and poor contrast, which can lead to poor performance of vision algorithms. A fog rectification algorithm improves the quality of the input images to vision algorithms.

The frame-based model 300 may include an Image From File block 332, a Device Under Test (DUT) hierarchical block 400, and two Video Viewer blocks 334 and 336. The Image From File block 332 may provide, e.g., feed, input images to the DUT hierarchical block 400 and to the Video Viewer block 334. The images from the Image From File block 332 may include Red, Green, and Blue (RGB) color channels. The DUT hierarchical block 400 may contain the fog rectification algorithm, and may output fog rectified images to the Video Viewer block 336. The fog rectified images generated by the DUT hierarchical block 400 also may include RGB color channels.

The Image From File block 332 may store or access input images of size 240×320×3, e.g., 240 pixels by 320 pixels by three color components, R, G, B. The Image From File block 332 may separate the R, G, and B components of the input images and output two-dimensional (2D) frames or matrices on each channel. Thus each input signal (R,G,B) at the DUT 400 may be an input matrix composed of 240×320 pixels, e.g., a frame.

In some embodiments, the frame-based model 300 may be a time-based block diagram.

It should be understood that the frame-based model 300 is meant for explanation purposes and the present disclosure may be used with other models, such as larger and/or more complex models. Exemplary inputs to a frame-based model to be translated to a sample-based model include image data, video data, or any large data of any number of dimensions.

Figure 4A:
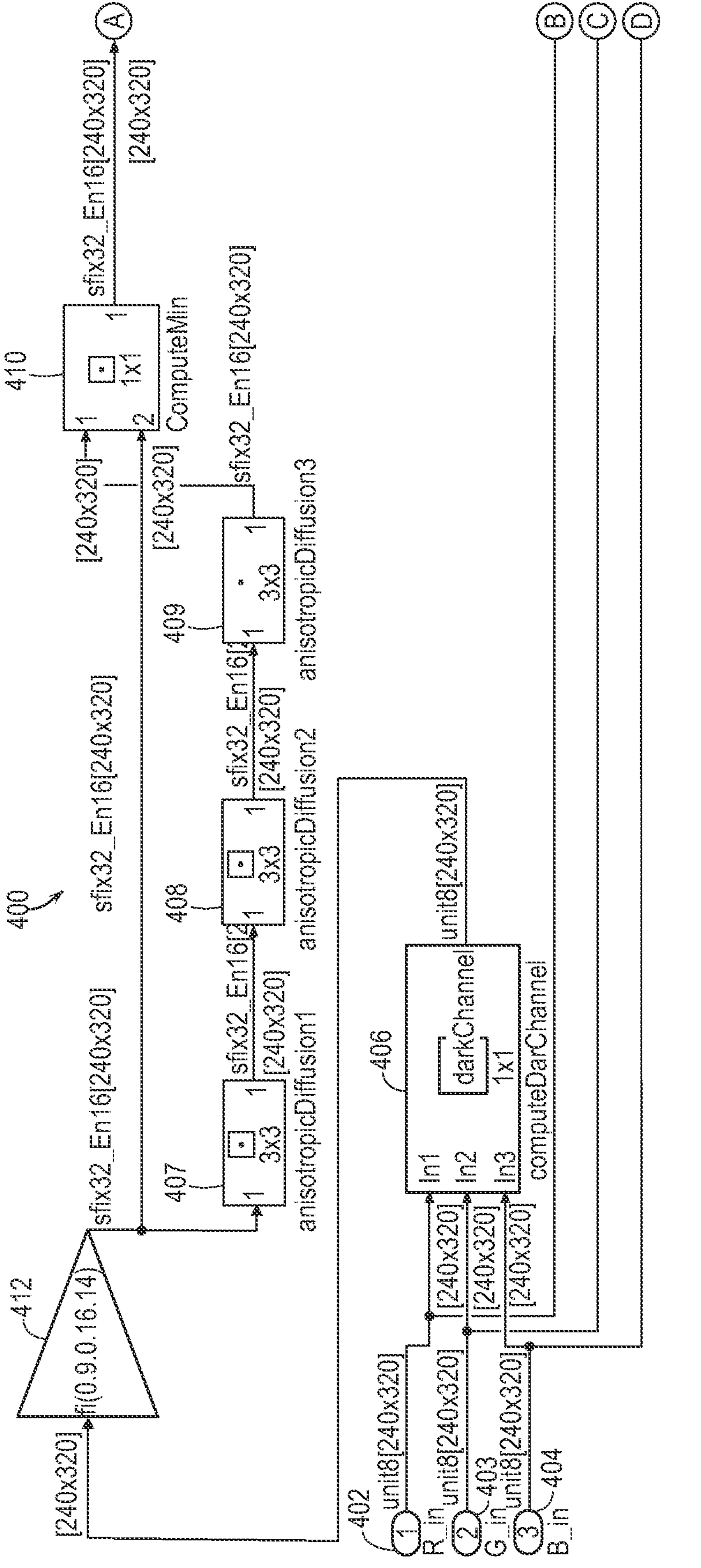
FIGS. 4A-B are partial views of an illustration of an example of a frame-based component from the model of FIG. 3 in accordance with one or more embodiments.
Figure 4B:
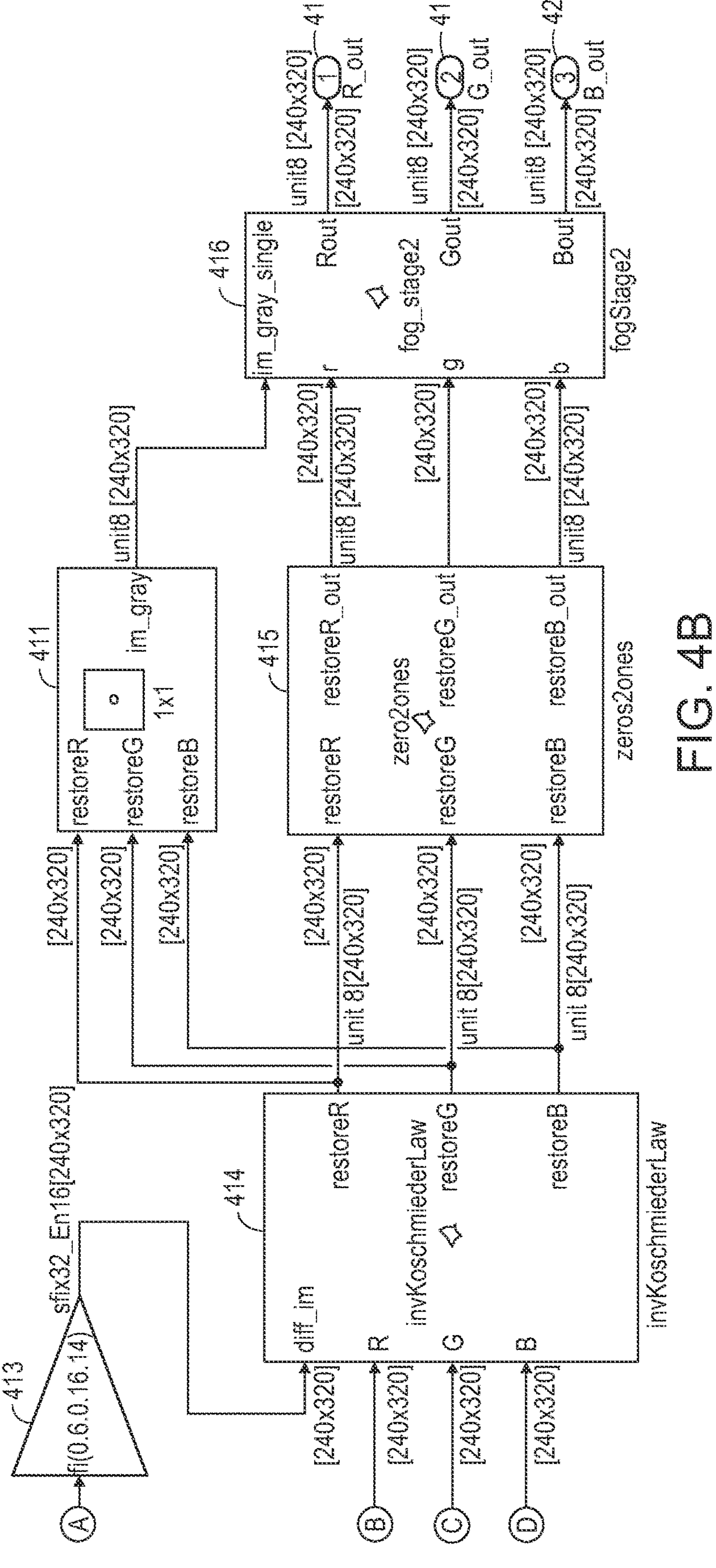

FIGS. 4A-B are partial views of an illustration of an example of the Device Under Test (DUT) hierarchical block 400 of FIG. 3 as opened to show the model elements contained therein in accordance with one or more embodiments. The DUT 400 may include three Inport blocks 402-404 named 'R', 'G', and 'B', six Neighborhood Processing Subsystem blocks 406-411 named 'computeDarChannel', 'anisotropicDiffusion1', 'anisotropicDiffusion2', 'anisotropicDiffusion3', 'ComputeMin', and 'convertToGrayScale', two Gain blocks 412 and 413, three MATLAB function blocks 414-416 named 'invKoschmiederLaw', 'zeros2ones', and 'fogStage2', and three Outport blocks 418-420 named 'Rout', 'Gout', and 'Bout'.

In response to user initiated or programmatic input, the simulation engine 108 may execute, e.g., run, a model, such as the frame-based model 300. For example, a user may select a Run button of the Simulation tab 304, or enter a text-based command. The model may also be executed programmatically, e.g., through a call from another program. The simulation engine 108 may execute the model over a logical simulation time, which may be user settable. In some embodiments, model execution may include a compile stage, a link stage, and a simulation loop stage. The compile and link stages may be performed by the model compiler 116 of the simulation engine 108. The compile stage may mark the start of execution of the model, and may involve preparing data structures and evaluating parameters, configuring, and propagating block characteristics (e.g., sample times, data types, etc.), determining block connectivity, performing block reduction and block insertion, and generating a sorted order of the equations corresponding to the blocks of the model. Block reduction may include collapsing and/or reducing one or more groups of blocks. For example, blocks or signals determined to be in an unused code path, e.g., dead code, rate transition blocks whose input frequency is faster than their output frequency, and type conversion blocks determined to be unnecessary may be collapsed or removed.

The preparation of data structures and the evaluation of parameters may create and initialize one or more data structures used in the compile stage. For each block, a method may force the block to evaluate all of its parameters. During the configuration and propagation of block and port/signal characteristics, the compiled attributes (such as data dimensions, data types, complexity, sample modes, and sample time) of each block (and/or ports) may be setup on the basis of the corresponding behaviors and the attributes of blocks (and/or ports) that are connected to the given block through connections, e.g., arrows. Attributes may also be set up based on the context of a block or a component in a model. For example, a subsystem that has a given sample time may have this sample time be set to the sample time of blocks included in the subsystem.

The attribute setup may be performed through a process during which block behaviors "ripple through" the model from one block to the next following signal or other data and/or control connectivity, as well as through the hierarchical structure of the model, and may for example follow data and/or control connectivity in a forward and/or backward manner. This process is referred to as "propagation." In the case of a block that has explicitly specified its block behaviors or the behaviors of its ports, propagation may help ensure that the attributes of the block are compatible with the attributes of the blocks connected to it or contained by it. If not, an error may be issued. At least some blocks may be implemented to be compatible with a wide range of attributes. Such blocks may adapt their behavior in accordance with the attributes of the blocks connected to them. The exact implementation of the block may be chosen on the basis of the model in which the block is located. Included within this step are other aspects such as validating that all rate-transitions yield deterministic results, and that the appropriate rate transition blocks are being used.

The compilation step also may determine block connectivity. For example, as noted above, a model may include one or more virtual blocks that may play no semantic role in the execution of the model. In this step, the virtual blocks may be optimized away, e.g., removed, and the remaining non-virtual blocks may be reconnected to each other appropriately. This compiled version of the model with actual block connections may be used from this point forward in the execution process, e.g., stored in memory as an internal representation or intermediate representation. For example, one or more in memory representations, such as intermediate representations (IRs), may be generated by the IR builder 120 of the model compiler 116. At least one of the IRs may be in the form of a directed graph, such as a hierarchical, Data Flow Graph (DFG) and/or a Parallel Intermediate Representation (PIR) having a plurality of nodes interconnected by edges. The nodes of the IR may represent blocks from the executable graphical model, the edges of the IR may represent connections among the model's blocks. Special nodes of the IR may be used to provide hierarchy in the IR, for example, by abstractly representing subsystems or other components of the model. In some implementations, blocks of the model may map to one or more nodes of the IR, and lines or arrows of the model may map to one or more edges of the IR.

It should be understood that an IR may take other forms, such as a Control Flow Graph (CFG), Control Data Flow Graph (CDFG), program structure tree (PST), abstract syntax tree (AST), a netlist, etc. A CDFG may capture the control flow as well as the data flow of a model through data dependency and control dependency edges.

The in-memory representations or IRs may be stored in memory, such as the main memory or a persistent memory of a data processing device.

Following the compilation stage, code may or may not be generated for the model. If code is generated, the model may be executed through an accelerated execution mode in which the model, or portions of it, is translated into either software modules or hardware descriptions, which is broadly referred to herein as code. If this stage is performed, then the stages that follow may use the generated code during the execution of the model. If code is not generated, the model may execute in an interpretive mode in which the compiled and linked version of the model may be directly utilized to execute the model over the desired timespan. When code is generated for a model, a user may choose to not proceed further with the model's execution. For example, the user may choose to take the generated code and deploy it outside of the simulation environment 100.

The link stage may involve memory allocation, and generation of a block method execution list, e.g., from the sorted order. During the simulation loop stage, the compiled and linked version of the model may be directly utilized by the simulation engine 108 to execute the model in an interpreted mode. The way in which the input and output of blocks are interconnected in the model does not necessarily define the order in which the equations (methods) corresponding to the individual blocks will be solved (executed). The actual order may be determined during the sorting step in compilation.

Model execution may be carried out for one or more top-level inputs, and may produce one or more results, which may be referred to as top-level outputs. As noted, model execution may take place over a timespan, e.g., a simulation time, which may be user specified or machine specified. For example, execution may begin at a simulation start time, include one or more time steps, and end at a simulation stop time. The start time, time steps, and stop or end time may be logical and have no correspondence with the physical passage of time. Nonetheless, in some implementations, such as models designed for real-time execution, the start time, time steps, and stop or end time may have a correspondence with the physical passage of time.

Alternatively or additionally to model execution, the code generation system 200 may generate code for at least a portion of the model. For example, code may be generated in response to user input or programmatically. For example, a user may select a code generation command button presented by the UI engine 102. Alternatively, the user may enter a text command to generate code for the model. In an embodiment, before launching the code generation process for the model, one or more code generation parameters or options may be selected. As described, the generated code may be in the form of a hardware description, for example, a Hardware Description Language (HDL), such as VHDL, Verilog, a netlist, or a Register Transfer Level (RTL) description. The hardware description may be utilized by the hardware synthesis tool 112 to configure a programmable logic device, such as Complex Programmable Logic Devices (CPLDs), Field Programmable Gate Arrays (FPGAs), and Application Specific Integrated Circuits (ASICs), among others. The generated code may be stored in memory, such as a main memory or persistent memory, of a workstation, server, or other data processing device.

FIGS. 5A-G are partial views of a flow diagram of an example method for transforming a frame-based source program, such as a frame-based simulation model, into a sample-based format suitable for generation of HDL code in accordance with one or more embodiments. The flow diagram of FIGS. 5A-G is meant for illustrative purposes only. For example, in some embodiments, one or more steps may be omitted, additional steps may be added, the order of steps may be changed, and/or one or more sequences indicated by the arrows may be altered or omitted. The code generation system 200 may access or receive a frame-based source program, such as the frame-based model 300, or a portion thereof for which code is to be automatically generated, e.g., the generated HDL code 228, as indicated at step 502. The code generation system 200 also may receive one or more options associated with the generation of the HDL for the frame-based based source program, as indicated at step 504. In some embodiments, the UI engine 102 may present one or more UIs through which one or more of the options may be specified, e.g., by a user.

Figure 6:
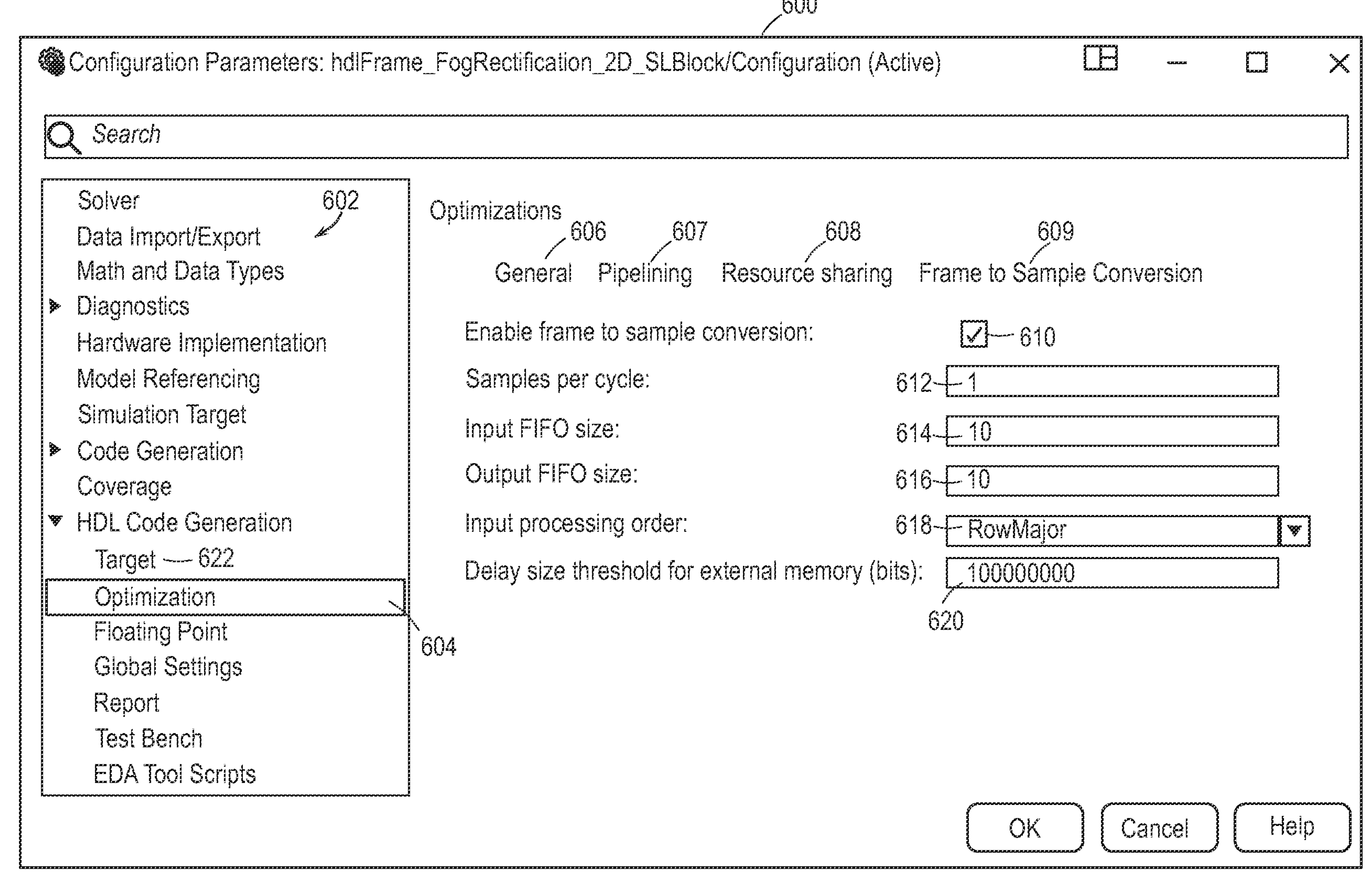
FIG. 6 is a schematic illustration of an example User Interface (UI) for specifying one or more parameters for transforming a frame-based model to a sample-based model in accordance with one or more embodiments.

FIG. 6 is a schematic illustration of an example User Interface (UI) 600 through which a user can specify one or more options for generating HDL code for the frame-based source program in accordance with one or more embodiments. The UI 600 may be generated by the UI engine 102 and presented on a display, e.g., of a data processing device. In some embodiments, the UI 600 may be in the form of a popup window presented with the model editor window 302. The one or more options may be implemented as configuration parameters for the frame-based source program, e.g., the frame-based model 300. The configuration parameters of a model may be organized by topic within a tree 602 and the one or more options for generating HDL code may be organized as optimization configuration parameters for HDL code generation as indicated by entry 604. The optimization entry 604 may include tabs 606-609 named 'General', 'Pipelining', 'Resource Sharing', and 'Frame to Sample Conversion'. The 'Frame to Sample Conversion' tab 609 may include one or more user interface elements for receiving the one or more options. For example, the tab 609 may include a checkbox 610 named 'Enable frame to sample conversion' for setting whether to enable the frame to sample conversion techniques of the present disclosure for the associated frame-based source program, e.g., the model 300. As illustrated, the checkbox 610 is marked, e.g., On, thus enabling frame-to-sample conversion for the frame-based model 300. The tab 609 may include a numeric data entry box 612 named 'Samples per cycle' for receiving a value specifying the size of the signals after the frame to sample conversion techniques of the present disclosure streams them. In some embodiments, the streamed input signal is either a scalar (one sample per cycle) or 1-D vectors with N elements (N samples per cycle). As illustrated, the numeric data entry box 612 is set to '1' for streaming the frame-based input signal one sample per clock cycle.

The tab 609 also may include numeric data entry boxes 614 and 616 named 'Input FIFO size' and 'Output FIFO size' to specify the register sizes, e.g., number of entries, of input and output FIFOs to be generated around streaming matrix partitions. The tab 609 may include a dropdown menu 618 named 'Input processing order' for indicating how the frame data input to the frame-based source program is processed. Exemplary options include row major and column major. As indicated, the dropdown menu 618 is set to row major. The tab 609 also may include a numeric data entry box 620 named 'Delay size threshold for external memory (bits)' to specify a threshold size in bits to offload large delays to external memory external to the programmable logic device, e.g., by mapping large delays to input and output ports to be generated for the frame-based source program. Offloading to external memory may be useful when a frame-based source program requires an input frame be delayed and operated on and the delay does not fit on the block RAM (BRAM) of the target programmable logic device. For example, if a frame-based source program requires a comparison between two different frames, which might otherwise create a large delay, the threshold parameter 612 may be set to save resources on the programmable logic device that might otherwise be used to store the delay.

The tree 602 may further include an entry 622 named 'Target' through which a user may identify the synthesis tool, the target programmable logic device, e.g., by manufacturer, product family, and device, and the target frequency of the programmable logic device.

In some embodiments, a user also may specify which inputs to a frame-based source program are to be converted from a frame-based signal to a sample-based signal by the code generation system 200. In addition to having one or more ports on which frame-based data, e.g., signals, are received, a frame-based source program may include one or more inputs, e.g., scalars, vectors, or arrays that need not be converted or are not selected for conversion to sample-based signals. In some embodiments, the simulation environment 100 may establish a parameter for inputs, e.g., Inport blocks, one of which may be set to True or On to indicate that the frame-based signal received at the Inport block is to be converted to a sample-based signal. Referring to FIG. 4A, a parameter, which may be named 'ConvertToSamples', for each of the Inport blocks 402-404 may be set to On, thereby directing the frame transformation system 208 to convert the frame-based signals received on the Inport blocks 402-404 to sample-based signals.

It should be understood that the UI 600 of FIG. 6 is meant for illustrative purposes and that other UIs may be used including Command Line Interfaces (CLIs). In some embodiments, the one or more options may include additional, fewer, or different parameters. For example, in other embodiments, a user may specify other types of on-device storage mechanisms besides FIFOs or specify the kind of control ports to generate at the inputs/outputs, e.g., other than a valid/ready interface as noted, such as start-of-frame/end-of-line signals, and combinations thereof.

The analyzer 212 and the partitioning engine 214 may partition the frame-based source program, e.g., the frame-based DUT 400, for further processing, as indicated at step 506. The analyzer 212 and the partitioning engine 214 may create partitions that include model elements that are data dependent. For example, the analyzer 212 and may traverse the data dependencies, e.g., paths, through the DUT 400 starting at the model's top-level input ports, e.g., the Inports 402-404, following the data paths to the model's outputs to identify model elements that are data dependent. For example, starting with a first data input, such as Inport block 402, the analyzer 212 may follow the connections and identify all of the model elements that are reached from the Inport block 402, e.g., Neighborhood Processing subsystem 406, Gain block 412, Neighborhood Processing subsystem 407, and so on. The partitioning engine 214 may include the model elements identified as being data dependent in a partition. The process may be repeated for the other data inputs to the frame-based model 300. The partitioning engine 214 may determine that the frame-based model 300 has a single partition. For other frame-based source programs, the partitioning engine 214 may identify multiple partitions.

The transformation engine 216 may then process each partition identified by the partitioning engine 214. For example, the transformation engine 216 may determine whether there is a partition to be process as indicated by decision block 508. If so, the transformation engine 216 may determine whether the partition includes an element-wise operation to be processed, as indicated by Yes arrow 510 leading to decision block 512.

If so, the transformation engine 216 may update the datatype and rate of signals in the partition, as indicated at step 511. The transformation engine 216 may set the datatype based on the value entered at the 'Samples per cycle' data entry box 612 (FIG. 6). For example, the transformation engine 216 may update the datatype of streamed signals to be scalar types, if the 'Samples per cycle' option is set to '1'. Otherwise, the transformation engine 216 may update the datatype of streamed signals to vectors or array types with the number of elements of the vector or array equal to the value of the 'Samples per cycle' parameter. The transformation engine 216 may update the rate of streamed and non-streamed signals in the partition as follows:

$$newRate = prevRate * SamplesPerCycle / (\text{number of elements in the streamed signals})$$

In some embodiments, the IR generator 204 may construct a separate node, e.g., a network node, such as a Parallel Intermediate Representation (PIR), for the partition.

Elementwise Operation

Figure 5A:
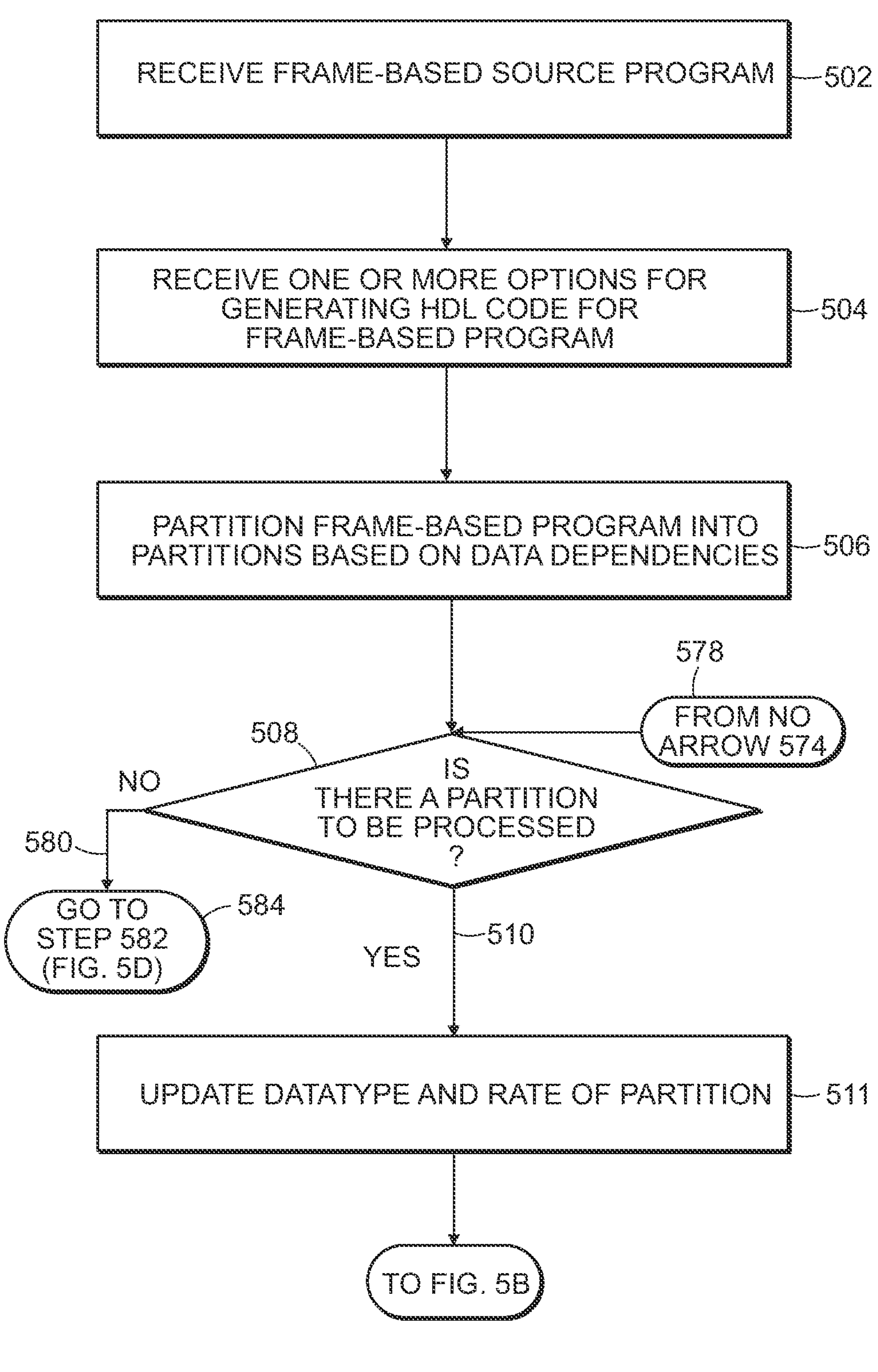
Figure 5B:
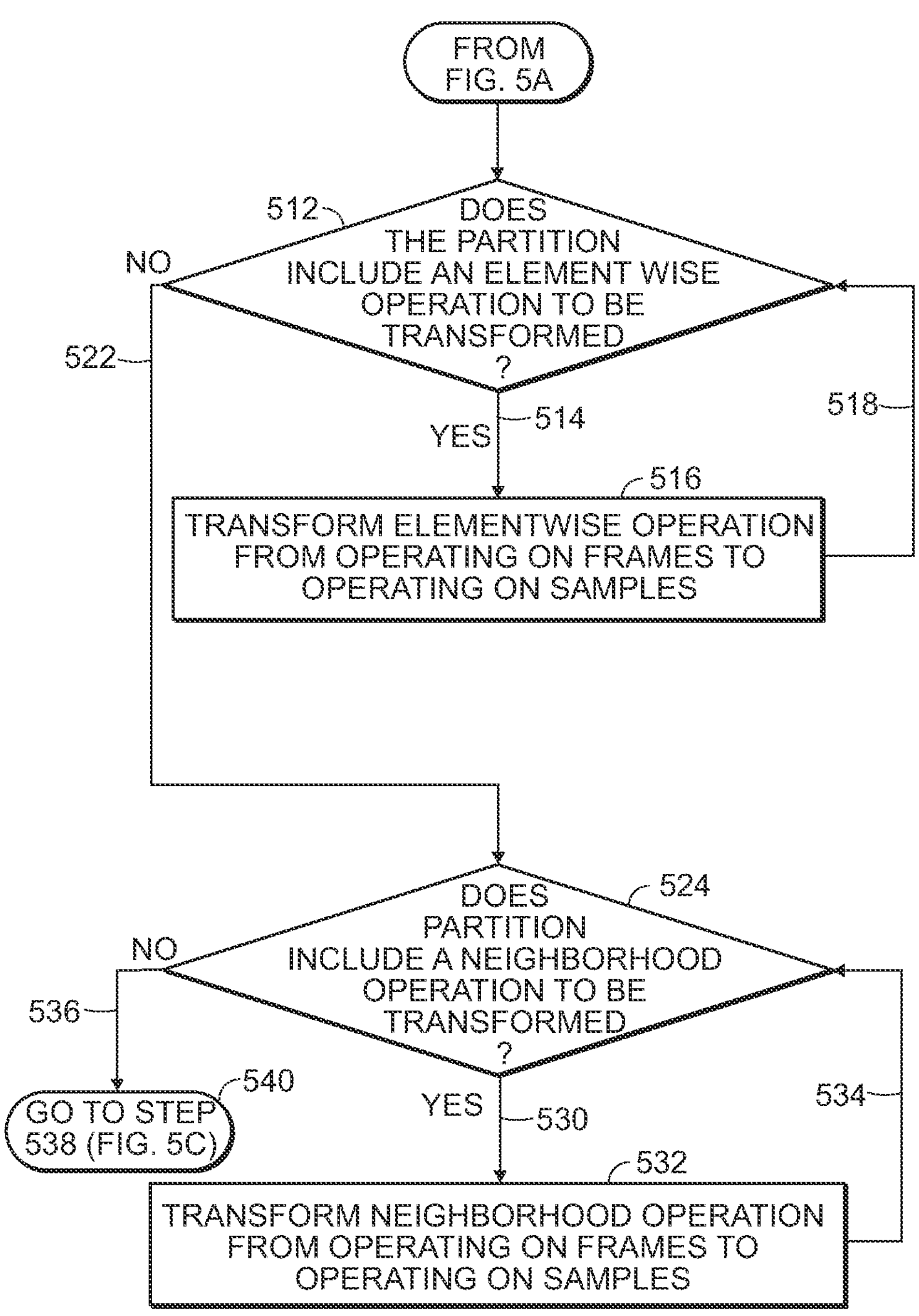
Figure 5C:
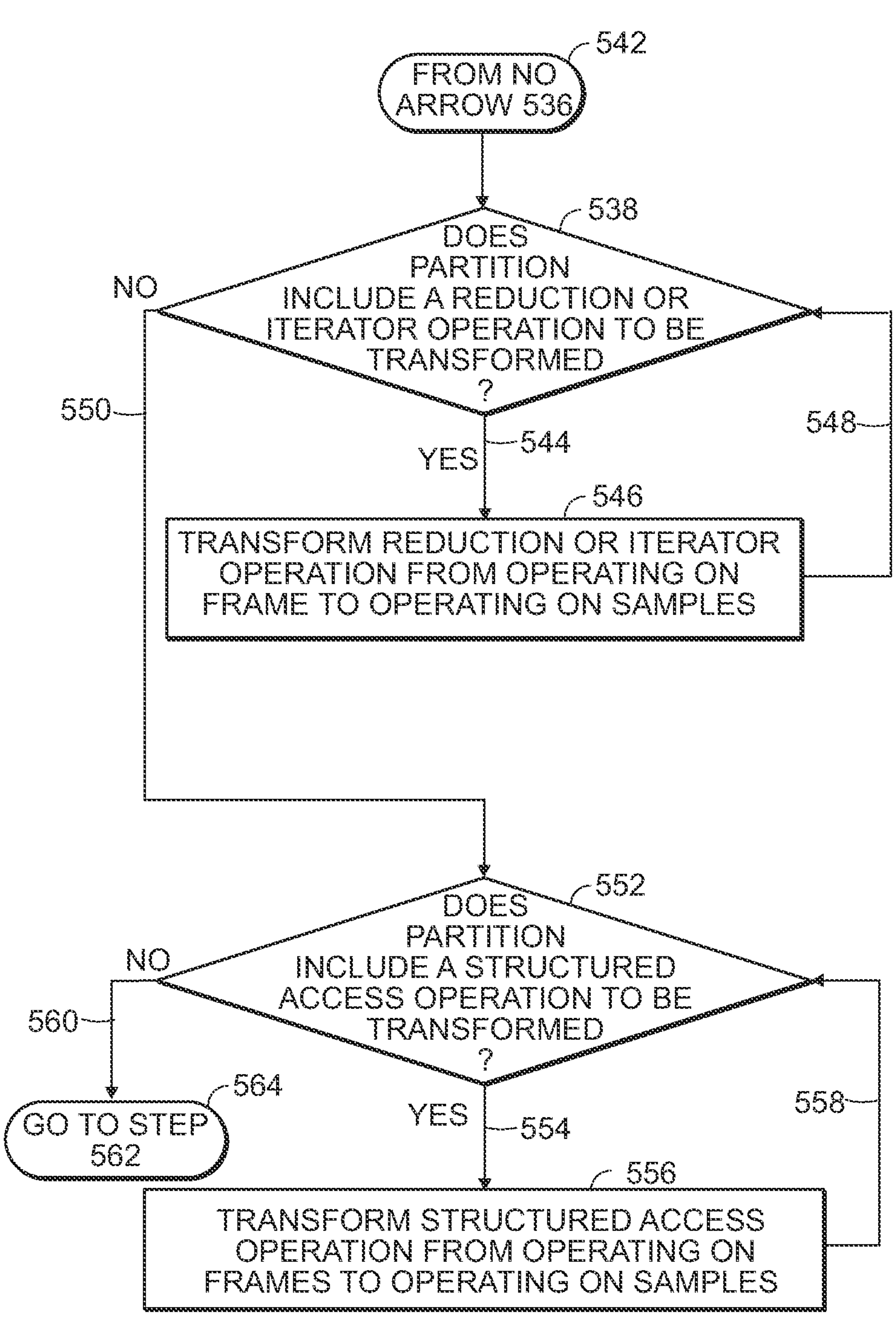

The transformation engine 216 may determine whether the partition includes an element-wise operation to be processed, as indicated by decision block 512 (FIG. 5B). Exemplary element-wise operations include the operations performed by Gain, Product, Subtract, Divide, Absolute Value, Data Type Conversion, Elementwise Logic Operation, Bitwise Operation, Elementwise Math operation, such as trigonometric functions and rounding operations, blocks, among others. If the transformation engine 216 determines that there is an element-wise operation in the partition, the transformation engine 216 may transform the element-wise operation from frame to sample operation, as indicated by Yes arrow 514 leading to step 516.

The transformation engine 216 may determine that the Gain block 412 is an element-wise operation. For example, as illustrated in FIG. 4A, the Gain block 412 receives a 240×320 frame, multiplies each element of the input frame by the block's numeric Gain parameter, e.g., '9', thereby producing a 240×320 output frame. The transformation engine 216 may convert the Gain block 412 from an in-memory representation operating on a frame to an in-memory representation operating on one sample during each execution, e.g., one element of the input frame at a time. The transformation engine 216 may not alter the Gain parameter when changing the Gain block 412 to operate on one sample at a time. The scheduler 220 may add input and output ports associated with the transformed Gain block for a valid signal to the in-memory Intermediate Representation (IR). For purposes of explanation, the transformations performed by the frame transformation system 208 may be described in terms of model elements, which may be illustrated in the figures of the present disclosure. Nonetheless, it should be understood that the changes implemented by the frame transformation system 208 may be performed on one or more in-memory intermediate representations (IRs) created for the DUT 400 and/or the frame-based model 300, thereby creating one or more new in-memory IRs that are sample-based.

After transforming the Gain block 412, processing may return to step 512 as indicated by loopback arrow 518. The transformation engine 216 may determine if there is another element-wise operation in the current partition to be transformed and, if so, transform that element-wise operation from frame-based operation to sample-based operation. For example, the transformation engine 216 may transform the Gain block 413 (FIG. 4B).

Neighborhood Operation

Once all of the element-wise operations of the current partition have been transformed from operating on frames to operating on samples, including the design and addition of valid signal ports, the transformation engine 216 may determine whether the current partition includes a neighborhood operation to be transformed, as indicated by No arrow 522 leading to step 524. If so, the transformation engine 216 may convert the frame-based neighborhood operation to operate on samples, as indicated by Yes arrow 530 leading to step 532.

Suppose the transformation engine 216 determines that the Neighborhood Processing Subsystem block 407 named 'anisotropicDifussion1' needs to be transformed from frame-based operation to sample-based operation.

Figure 7:
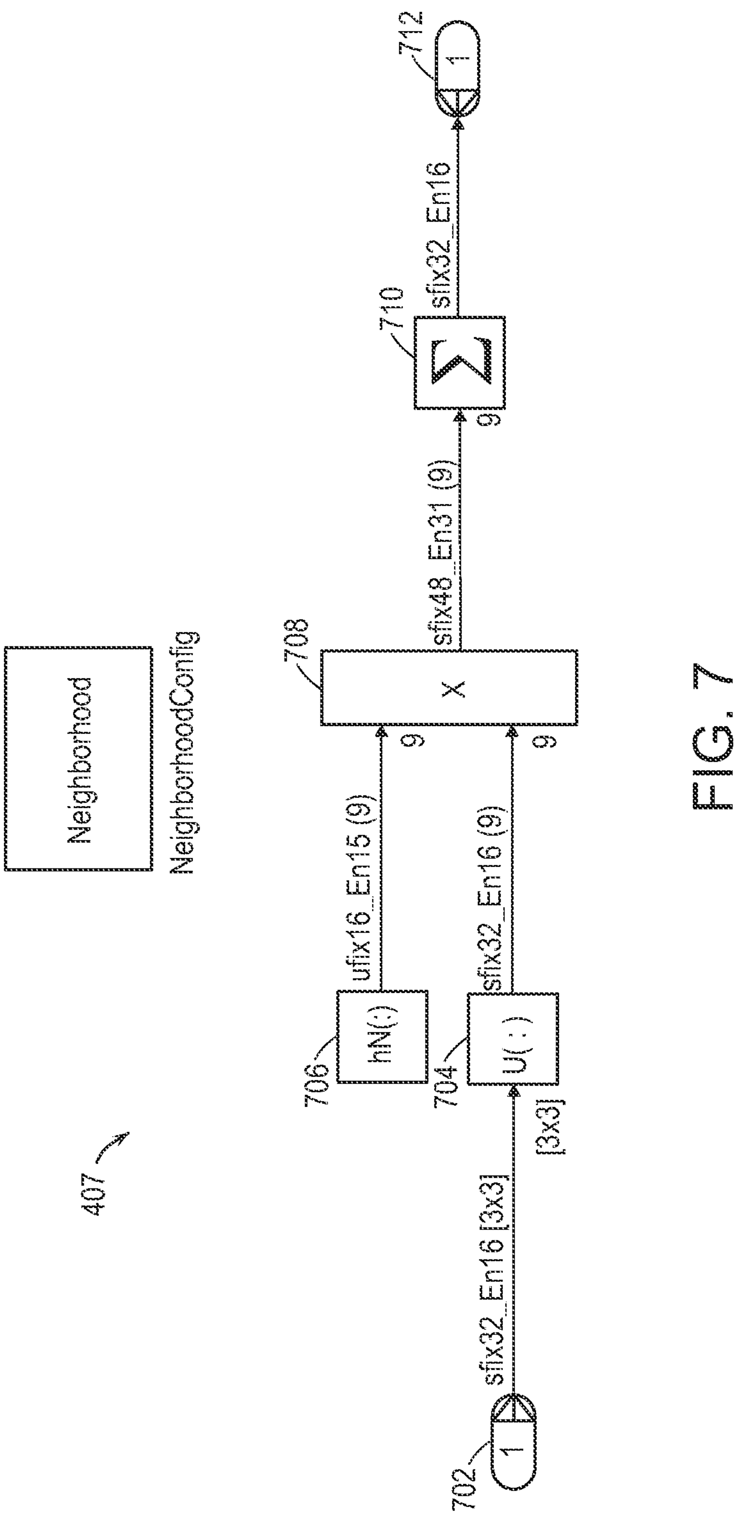
FIG. 7 is a schematic illustration of an example of a frame-based subsystem from the component of FIGS. 4A-B in accordance with one or more embodiments.

FIG. 7 is a schematic illustration of the frame-based Neighborhood Processing Subsystem block 407 opened to show the model elements contained therein in accordance with one or more embodiments. The Neighborhood Processing Subsystem block 407 includes an Inport block 702, a Reshape block 704, a Constant block 706, a Product block 708, a Sum of Elements block 710, and an Outport block 712. The Neighborhood Processing Subsystem block 407 accesses a 3×3 window of elements from the 240×320 input frame, multiplies each element of the 3×3 window by a scalar filter, e.g., a coefficient, stored at the Constant block 706, sums the nine values resulting from the multiplication operation and creates a 240×320 output frame by placing the computed sum of the nine values in the output frame at the location corresponding to the center of the 3×3 window of the input frame. This process is repeated for each element of the input frame, e.g., with each element located at the center of the 3×3 window. That is, the Neighborhood Processing Subsystem block 407 slides the 3×3 window across the entire input frame one element at a time.

The analyzer 212 may analyze the current neighborhood operation, e.g., the Neighborhood Processing Subsystem block 407, and may determine its parameters, such as the size of the input frame, the region of interest, if any, the size of the neighborhood, the stride of the neighborhood, the size of the filter, the stride of the filter, whether padding is performed and, if so, the padding value(s), and the size of the output frame.

For the Neighborhood Processing Subsystem block 407, the size of the input frame is 240×320, the region of interest is the entire input frame, the size of the neighborhood is 3×3, the stride of the neighborhood is one, the size of the filter is one, i.e., a scalar, the padding value is zero, there is no stride for the filter (because it is a scalar value), and the size of the output is 240×320. The analyzer 212 may determine these values by examining the parameters for the neighborhood operation, e.g., the parameters of the Neighborhood Processing Subsystem block 407 and the parameters of the model elements contained in the Neighborhood Processing Subsystem block 407 as maintained by the simulation engine 108.

To transform a neighborhood operation from frame-based to sample-based, the transformation engine 216 may design and create one or more memory structures for storing the elements needed for the current neighborhood and one or more memory structures for storing the filter. The logic generator 218 may design and create logic for tracking where in the input frame the current neighborhood is located, e.g., by counting the elements of the input frame as they are received. The logic generator 218 may design and create logic for checking whether the current neighborhood is at a boundary of the input frame and, if so, for inserting the specified padding.

In some embodiments, the transformation engine 216 may create a new model element, which may be referred to as a Neighborhood Creator subsystem block that contains some or all of this logic. The transformation engine 216 may also convert the neighborhood operation from operating on a frame to operating on samples.

Figure 8:
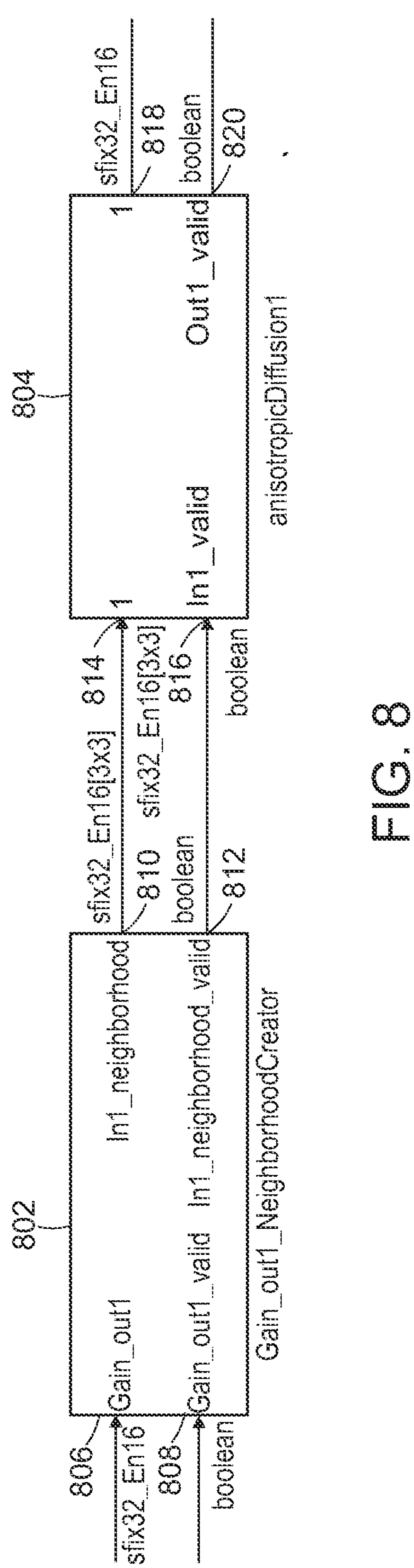
FIG. 8 is an illustration of an example of two components created for a frame-based neighborhood operation in accordance with one or more embodiments.

FIG. 8 is an illustration of a Neighborhood Creator subsystem block 802 and a sample-based Neighborhood subsystem block 804 created by the transformation engine 216 for the Neighborhood Processing Subsystem block 407 of the DUT 400 in accordance with one or more embodiments. The Neighborhood Creator subsystem block 802 receives the output from the transformed Gain block and a valid signal as indicated at inputs 806 and 808. The Neighborhood Creator subsystem block 802 outputs the elements of the 3×3 neighborhood to be processed and a valid signal as indicated by outputs 810 and 812. The Neighborhood subsystem block 804 receives the 3×3 neighborhood and the valid signal as indicated at inputs 814 and 816 and outputs the computed value for the neighborhood and a valid signal as indicated at outputs 818 and 820.

Figure 9:
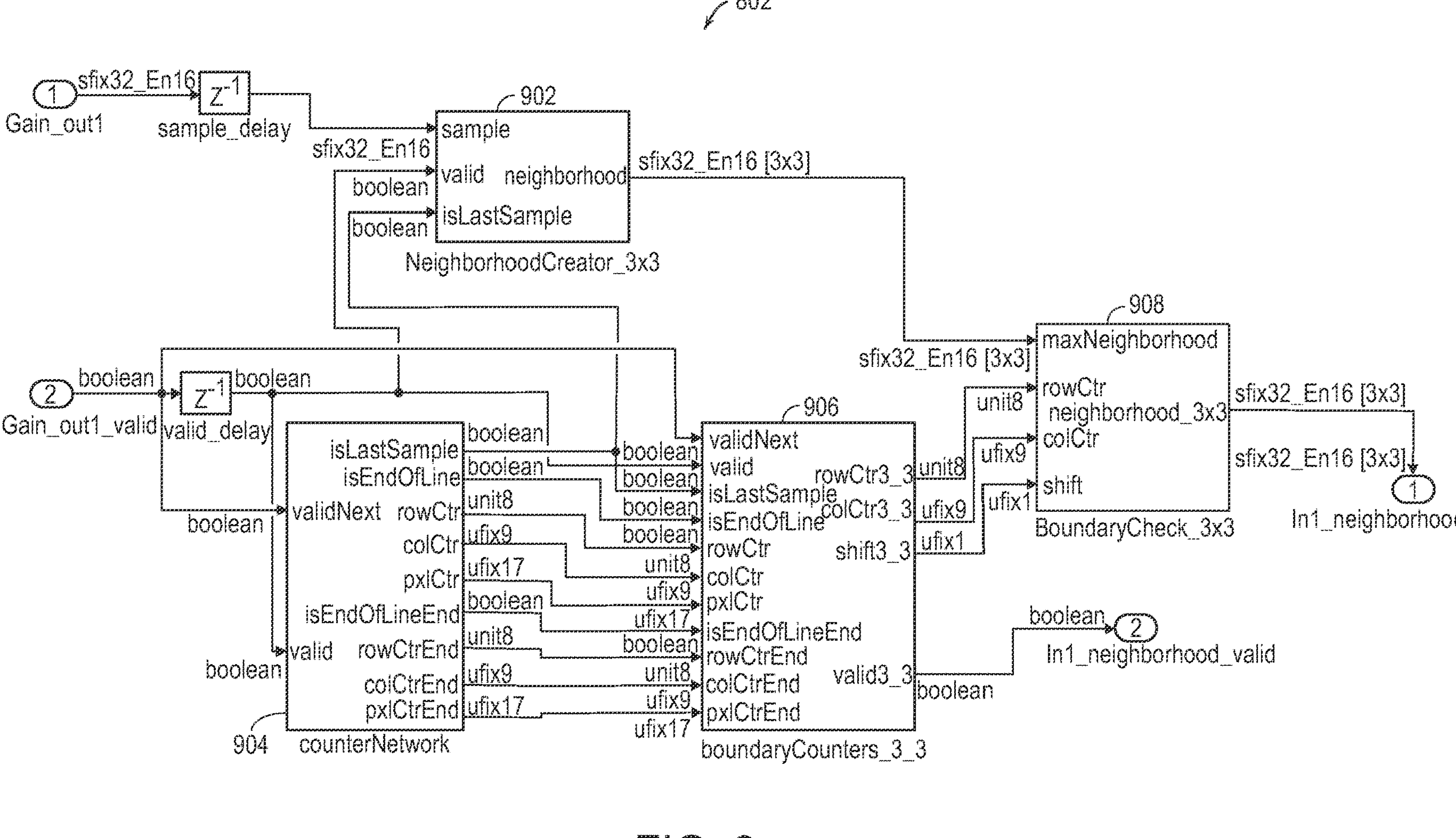
FIG. 9 is an illustration of an example of one of the components of FIG. 8 in accordance with one or more embodiments.

FIG. 9 is an illustration of an example of the Neighborhood Creator subsystem block 802 of FIG. 8 as opened to show the model elements contained therein in accordance with one or more embodiments. The Neighborhood Creator subsystem block 802 includes a subsystem 902 named 'NeighborhoodCreator_3×3' containing functionality for creating the neighborhood, a subsystem 904 named 'counterNetwork' containing functionality for counting input elements and determining where in the input the current neighborhood is located, a subsystem 906 named 'BoundaryCounters_3_3' containing functionality for determining if the current neighborhood is at a boundary of the input, and a subsystem block 908 named 'BoundaryCheck_3×3' for adding padding, if necessary, to the current neighborhood.

Based on the current location of the most recently-obtained element, e.g., pixel, in the frame, e.g., image, some values in the neighborhood may need to be replaced with other values to implement a boundary condition. Example boundary conditions are "constant," where every out-of-bounds value is replaced by a user-supplied constant, and "replicate," where out-of-bounds values are set to the same value as the closest in-bounds value. Based on the row and column index of the last pixel obtained, the "BoundaryCheck_3×3" subsystem block 908 may replace some values in the input neighborhood with boundary values to produce the final output neighborhood.

The NeighborhoodCreator_3×3 subsystem block 902 includes one or more memories, such as line buffers implemented through block Random Access Memory (BRAM), for storing input elements, e.g., samples, to form the current neighborhood. In some embodiments, where the neighborhood size is 3×3 as here, the transformation engine 216 may configure the 'NeighborhoodCreator_3×3' subsystem block 902 to store two full lines, e.g., rows, of the input and at least a portion of a third line. For example, the 'NeighborhoodCreator_3×3' subsystem block 902 may include at least two line buffers for the two plus lines being stored. The two line buffers may contain elements that will be in future neighborhoods. Each element, e.g., pixel, of the input frame, e.g., image, may first appear on the bottom row of a neighborhood, may then appear on the middle row, and then finally appear on the top row. A first Line buffer may store values that have been on the bottom row and will be on the middle row. A second line buffer may store values that have been on the middle and bottom rows and will be on the top row. As there are no lines above the top row, there need not be a third line buffer. For a neighborhood operation where the neighborhood size is 5×5, the transformation engine 216 may store four full lines and at least a portion of a fifth line. Nonetheless, in some embodiments, the transformation engine 216 may design and add memory for storing three (or five) full lines as the case may be.

Figure 10:
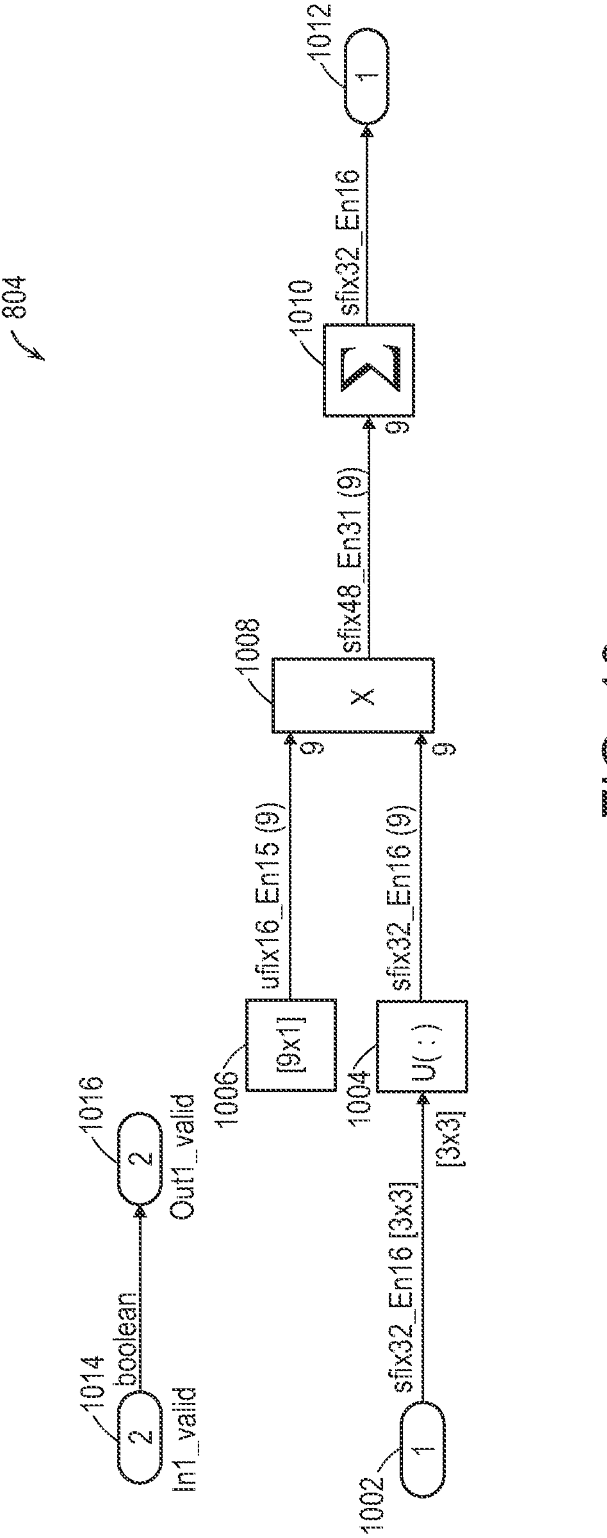
FIG. 10 is an illustration of an example of another of the components of FIG. 8 in accordance with one or more embodiments.

FIG. 10 is an illustration of an example of the sample-based Neighborhood Processing Subsystem block 804 of FIG. 8 as opened to show the model elements contained therein in accordance with one or more embodiments. Similar to the frame-based Neighborhood Processing Subsystem 407 (FIG. 7), the sample-based subsystem block 804 includes an Inport block 1002, a Reshape block 1004, a Constant block 1006, a Product block 1008, a Sum of Elements block 1010, and an Outport block 1012. The Reshape block 1004, the Constant block 1006, and the Product block 1008 each output nine elements per clock cycle. The Sum of Elements block 1010 outputs one element per clock cycle.

The transformation engine 216 also includes an additional Inport block 1014 named 'In1_valid' and an additional Outport block 1016 named 'Out1_valid' for the valid signal of the 'anisotropicDiffusion1' subsystem block 804. While the Inport block 702 converts the 240×320 input to the 3×3 neighborhood, the Inport block 1002 receives the 3×3 neighborhood from the neighborhood creator subsystem 802 and thus does not perform such a conversion. Similarly, while the Outport block 712 converts the received scalar to the 240×320, the Outport block 1012 outputs the received scalar.

After transforming the Neighborhood Processing Subsystem block 407, processing may return to step 524 as indicated by loopback arrow 534. The transformation engine 216 may determine if there is another neighborhood operation in the current partition to be transformed and, if so, transform that next neighborhood operation from operating on a frame to operating on a sample. For example, the transformation engine 216 may transform the Neighborhood Processing Subsystem block 408 named 'anisotropicDiffusion2', then the Neighborhood Processing Subsystem block 408 named 'anisotropicDiffusion3', and so on.

Reduction/Iterative Operation

Once the transformation engine 216 has transformed all of the neighborhood operations of the current partition from operating on frames to operating on samples, the transformation engine 216 may determine whether the current partition includes a reduction or iterator operation to be transformed, as indicated by No arrow 536 leading to step 538 (FIG. 5C) via GoTo and From steps 540 and 542. If so, the transformation engine 216 may transform the reduction or iterator operation from operating on frames to operating on samples, as indicated by Yes arrow 530 leading to step 532. Reduction or iterator operations are typically operations that are iteratively applied over all the elements of a frame, e.g., all pixels of an input image. The output may be a frame of the same size as the input, a frame of smaller size, a vector, or a scalar. Min/Max and histogram operations are representative of a class of reduction operations in which an entire frame, e.g., image, is scanned to produce a small number of values. Other examples include computing the average of all elements, e.g., pixels, the sum of all elements, e.g., pixels, the total number (count) of elements, e.g., pixels of a particular value, e.g., color, etc.

Referring to FIG. 4B, the DUT 400 includes the MATLAB function block 416 named 'fogStage2'. FIGS. 11A-B are partial views of an example a listing of MATLAB code 1100 contained in the MATLAB function block 416 in accordance with one or more embodiments. The code 1100 receives a 240×320 input frame, e.g., an image in grayscale format, and as shown at line 14 utilizes an hdl.iteratorfun function 1102 to compute a histogram on the entire input, e.g., image. The hdl.iteratorfun function 1102 applies an iterative operation 1104 to each element of input data 1106, stores the output from each iteration called 'hist' 1108, and returns the final output from the last iteration as the output 1110 of the function 1102. The iterative operation 1104 is defined by a function handle '@hist_kernel_fun', whose functionality is defined at lines 47-51. The histogram computed by the code 1100 is a 256-element vector where each element represents the frequency of occurrence of the corresponding intensity level in the input image, where 0 is the darkest shade and 255 is the brightest shade. The code 1100 computes the histogram by looping over each pixel in the input image. For each pixel, the code 1100 extracts the intensity level and increments a corresponding bin of the histogram vector as indicated at line 49. The resulting histogram provides a summary of the distribution of pixel intensities in the input image.

The code 1100 then calculates the cumulative distribution function (CDF) from the histogram. The CDF maps the intensity values of the input image to their cumulative frequencies of occurrence. The CDF is computed from the histogram of the input image, which as noted above is a plot of the number of pixels at each intensity level. The CDF of an image is defined as the integral of the probability density function (PDF) of the image up to a given intensity value. The CDF represents the probability that a pixel in the input image has an intensity value less than or equal to a given value. That is, the CDF provides information about the distribution of pixel intensities in the input image. By computing the CDF, it is possible to determine the range of intensities that occur most frequently in the input image, and to identify the presence of any outliers or unusual intensity values.

The code 1100 next computes the breakpoints of a lookup table based on the CDF, and creates the lookup table. The code 1100 uses the lookup table to map the Red (R), Green (G), and Blue (B) input image pixel values of the input image to new Red (R), Green (G), and Blue (B) pixel values that enhance the contrast of the input image and reduce the effect of fog. The output of the code 1100 is three images, corresponding to the red, green, and blue channels of the input image. The code 1100 generates the output images by using the lookup table to map the pixel values in the original RGB image to the new RGB pixel values.

The analyzer 212 analyzes the iterator function 1102 and the functional handle 1104 to determine the size of the input 1106 which is 240×320, e.g., 76,800 elements, the size of each iteration 1108, e.g., a 256-element vector, which corresponds to the histogram. The analyzer 212 also determines the functionality being performed by the iterator function 1102, e.g., determining which bin of the histogram the intensity of the current pixel belongs, and incrementing that bin. The analyzer 212 determines that the iterator function 1102 must process the entire input 1106 to complete creation of the histogram. Thus, other functions in the code 1102 that utilize the histogram, such as the hdl.iteratorfun at line 17, cannot proceed until the entire image has been processed and the histogram constructed.

The transformation engine 216 may design and create a subsystem that implements the iterator function 1102 operating on samples.

Figure 12:
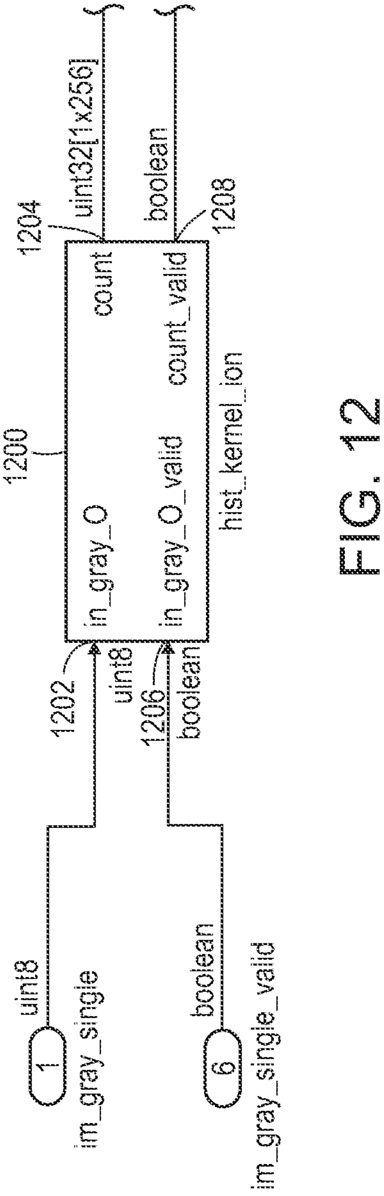
FIG. 12 is an illustration of an example of a component created for a frame-based iterator operation in accordance with one or more embodiments.

FIG. 12 is an illustration of an example iterator subsystem 1200 created by the transformation engine 216 in accordance with one or more embodiments. The iterator subsystem 1200 has an input 1202 named 'im_gray_0' for receiving the grayscale input image one pixel at a time. The iterator subsystem 1202 also includes an output port 1204 named 'count' that outputs the computed histogram. The scheduler 220 adds an input port 1206 named 'im_gray_0_valid' and an output port 1208 named 'count-valid' for the valid signal.

Figure 13A:
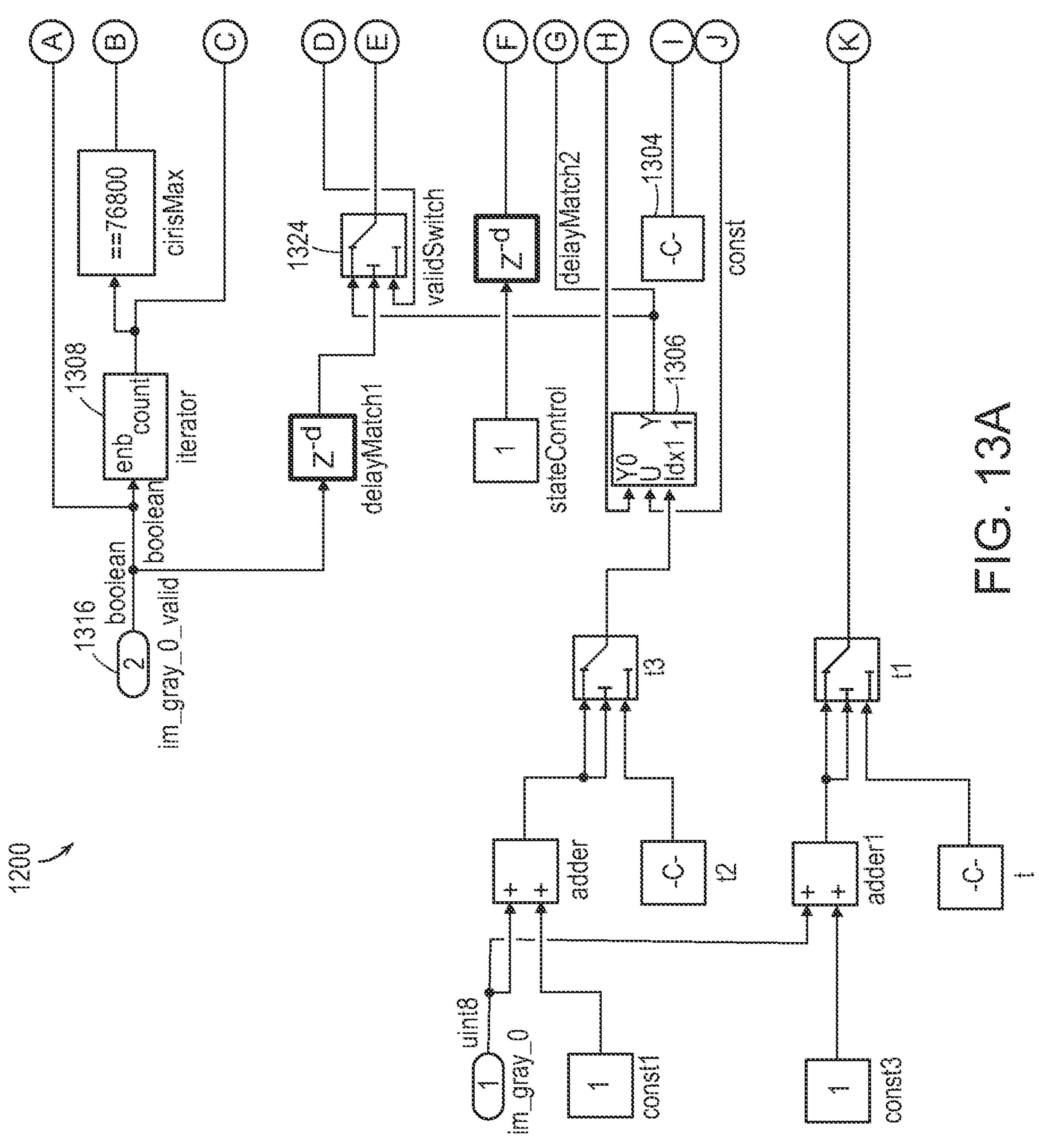
FIGS. 13A-B are partial views of an example of the elements included in the component of FIG. 12 in accordance with one or more embodiments.
Figure 13B:
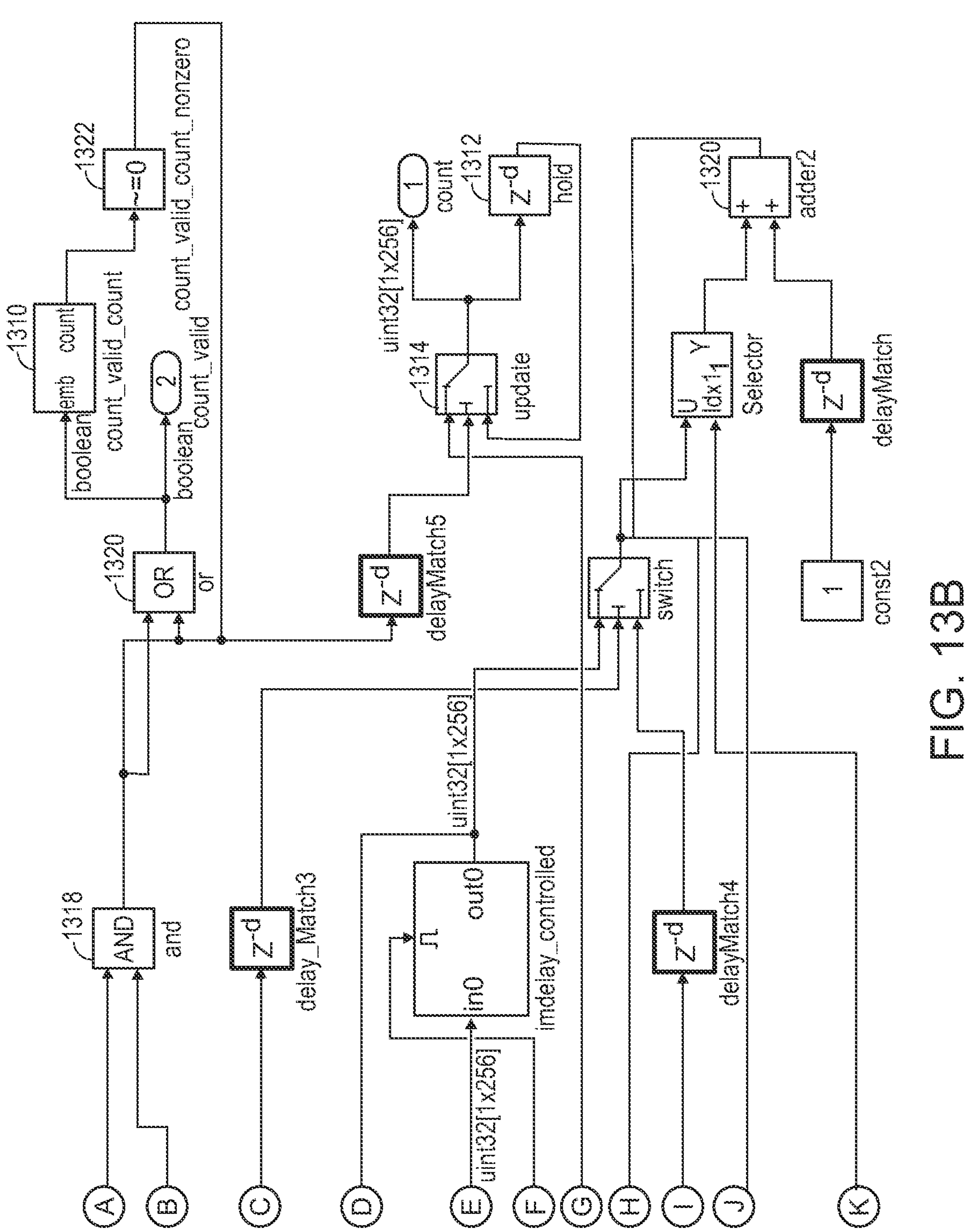

FIGS. 13A-B are partial views of an example of the iterator subsystem 1200 of FIG. 12 as opened to show the model elements contained therein in accordance with one or more embodiments. The iterator subsystem 1200 includes a Adder block 1302 (FIG. 13B) that increments the element of the 256-element vector, e.g., bin, to which the current pixel on the input image belongs. A Constant block 1304 (FIG. 13A) may store the initial value of the histogram, and an Assignment block 1306 may update a particular value of the histogram each cycle. Counters may be used to keep the valid signal low until the histogram is finished. For example, when a Counter block 1308 (FIG. 13A) named 'iterator' reaches its maximum value, a first valid-high signal may be emitted and a count begins at a Counter block 1310 named 'count_valid_count', which may keep the valid output high for a full frame length. A Delay block 1312 named 'hold' and a Switch block 1314 named 'update' may hold the output steady throughout the time the valid signal is emitted.

The transformation engine 216 may design and add input and output valid signals. For example, an Inport block 1316 (FIG. 13A) named 'im_gray_0_valid' receives the input valid signal and enables the Counter block 1308. Logical Operator blocks 1318 and 1320 named 'and' and 'or' (FIG. 13B), the Counter block 1310, and a Counter block 1322 named 'count_valid_count_nonzero' implement the output valid signals. The transformation engine 216 also may design and add output hold logic, e.g., the Delay block 1312 and the Switch block 1314. The transformation engine 216 also may design and add logic preventing internal memory for a loopback variable from being updated on invalid signals, e.g., a Switch block 1324 (FIG. 13A) named 'valid-Switch'.

Figure 14:
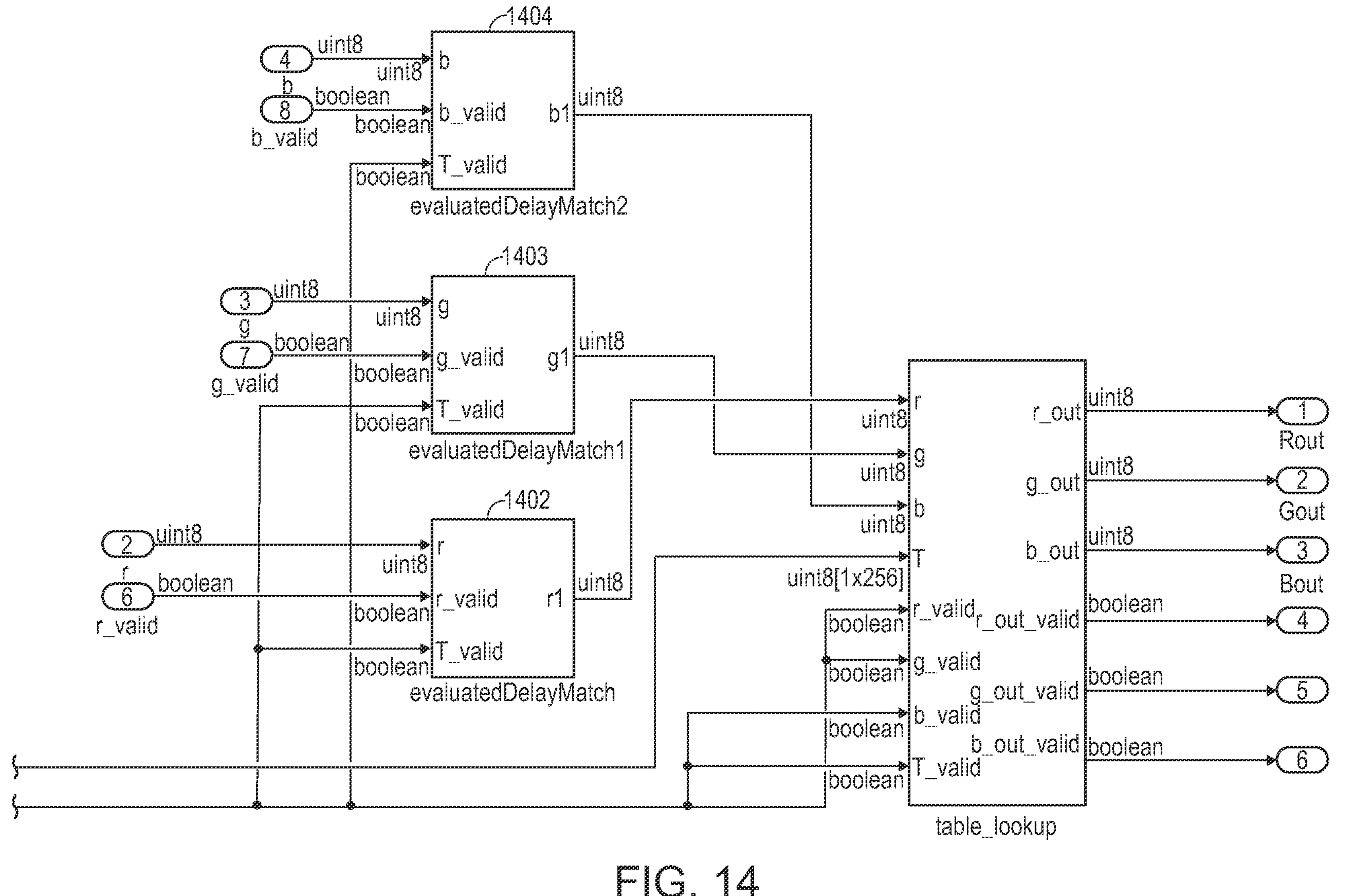
FIG. 14 is an illustration of an example of a portion of a sample-based implementation of an iterator operation in accordance with one or more embodiments.

FIG. 14 is an illustration of an example of a portion 1400 of the sample-based implementation of the MATLAB code 1100 in accordance with one or more embodiments. The portion 1400 includes three storage subsystems 1402-1404 named 'enabledDelayMatch', 'enabledDelayMatch1', and 'enabledDelayMatch2'. The transformation engine 216 creates each subsystem 1402-1404 with a memory, such as an HDL First-In-First-Out (FIFO) block which stores a sequence of input samples in a FIFO register. The transformation engine 216 may configure each memory to store 76,799 elements, which is one less than the elements of the 240×320 input frame. The subsystems 1402-1404 may align the inputs 'r', 'g', 'b' with the output of the 'hist_kern_fcn' computation. The delay is one less than the number of samples in the input frame because the final sample produces the final output of the 'hist_kernel_fct' computation. During HDL code generation, the code generation system 200 may map an HDL FIFO block to block RAM (BRAM) on the programmable logic device.

In some embodiments, the transformation engine 216 may determine that the size of the HDL FIFO blocks of one or more of the subsystems 1402-1404 will exceed the resources available on the target programmable logic device. That is, the programmable logic device may not have sufficient BRAM, registers, or other blocks to construct the subsystems 1402-1404 on the programmable logic device. In this case, the transformation engine 216 and logic generator 218 may design and add logic for storing the data external to the programmable logic device. For example, the logic generator 218 may not include the subsystems 1402-1404 and may instead route the signals leading to the subsystems 1402-1404 to ports of the programmable logic device so the data may be stored in and retrieved from external memory. The logic generator 218 also may design and add logic to support exchanging date with the external memory according to one or more data exchange protocols, such as one of the Advanced extensible Interface (AXI) protocols, which are part of the ARM Advanced Microcontroller Bus Architecture (AMBA). Nonetheless, other interfaces and/or communication protocols may be used.

In some embodiments, the determination when data cannot be stored on the programmable logic device and must instead be off-loaded to external memory may be based on the value of the 'Delay size threshold for external memory (bits)' parameter at numeric data entry box 620 (FIG. 6). For example, the transformation engine 216 may compute the delay needed to store the data on the programmable logic device, e.g., using the subsystems 1402-1404. If the computed delay exceeds the value entered in the 'Delay size threshold for external memory (bits)' numeric data entry box 620, then the transformation engine 216 and the logic generator 218 may design and generate the logic to off-load the data to external memory. Among other functionality, this logic may pass values that would be stored in an on-board memory to one or more external memory elements. It may also generate logic to request values from the one or more external memory elements and halt processing in the DUT if the values from the one or more external memory elements are not available at the time they are required by the DUT.

This logic may map memory elements which would be implemented with on-board FIFO memories to external memory elements. These FIFO memories may be produced in response to the user adding a delay of one or more frames to their input frame-based algorithm, or they may be generated automatically during delay balancing, or they may be produced through some other means. These FIFO memories may have a data input port, an input "push" signal indicating that a data value should be written to the FIFO, a "pop" signal indicating that the FIFO should produce a value on the next cycle, and an output data signal. Any FIFO which is determined to be of sufficient size to be a candidate for external mapping may be mapped to an external memory.

When mapping a particular FIFO to external memory, the scheduler 220 may add new inputs and outputs to the sample-based algorithm. A FIFO may generate a new data input with an associated valid input and ready output, and a new data output with associated valid output and ready input. The sample-based algorithm may use this valid/ready interface to implement the external memory.

At the output, the scheduler 220 may use the original FIFO's "push" signal as a valid signal in order to implement an output FIFO which may be identical to the output FIFOs for other sample-based data outputs of the algorithm.

Figure 23:
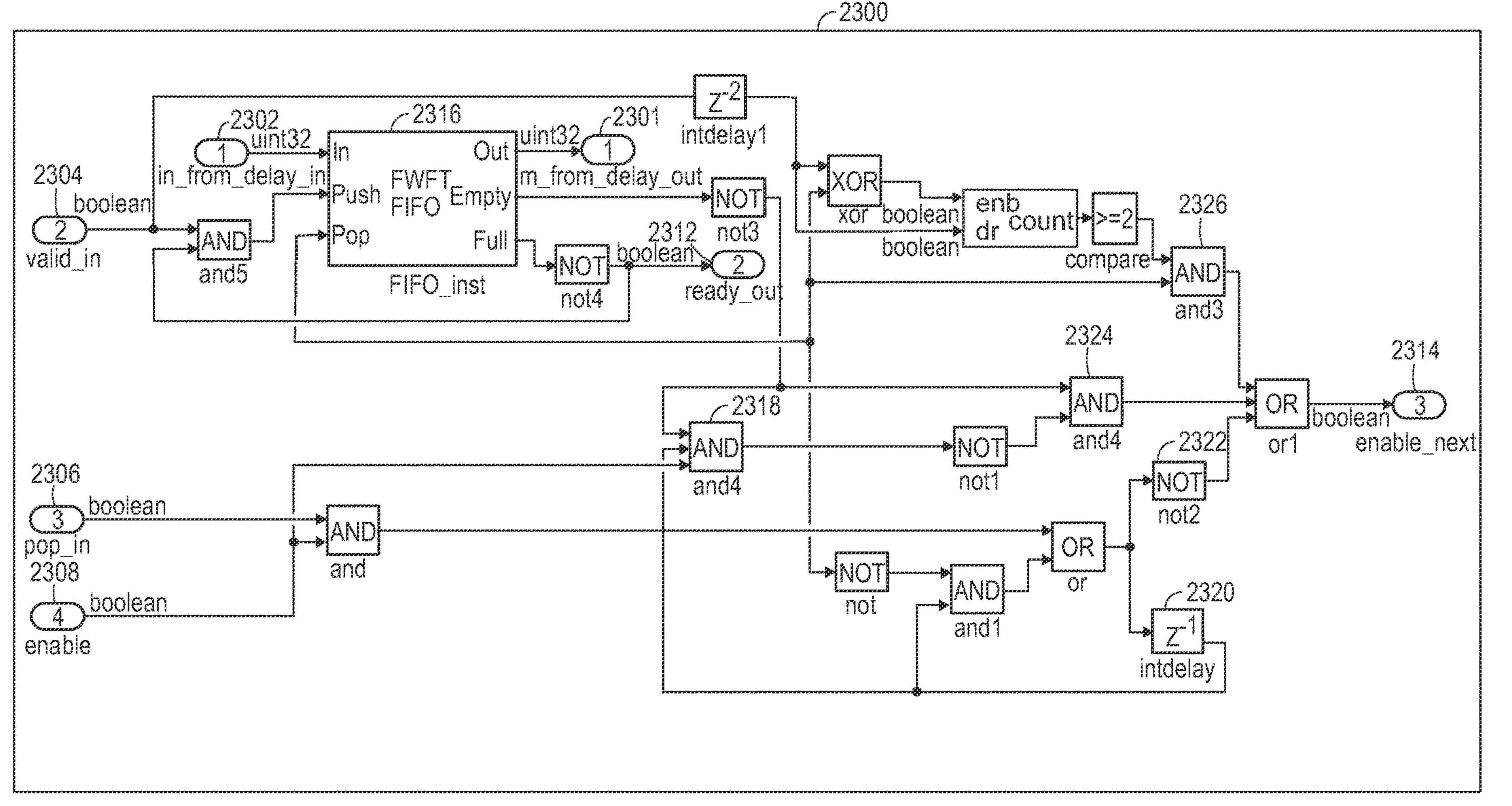
FIG. 23 is a schematic illustration of an input FIFO in accordance with one or more embodiments.

At the input, the scheduler 220 may insert an input FIFO to implement the input data/valid/ready interface. This input FIFO may be distinct from input FIFOs for other sample-based inputs to the algorithm. FIG. 23 is a schematic illustration of an input FIFO 2300 in accordance with one or more embodiments. The input FIFO 2300 may have several inputs including: (1) a data input 2302, coming from the external memory interface; (2) a valid input 2304, coming from the external memory interface; (3) a "pop_in" 2306, coming from the sample-based algorithm, which is the "pop" input signal that was sent to the original FIFO which was mapped to external memory; and (4) an "enable_in" 2308, indicating whether the associated streaming partition is enabled on this cycle. The FIFO 2300 may have several outputs including: (1) a data output 2310, going to the sample-based algorithm; (2) a ready output 2312, applying back pressure if necessary to the external memory interface; and (3) an "enable_next" 2314, which indicates whether the associated streaming partition should be enabled on the cycle after this one. The input FIFO 2300 may also include an HDL FIFO block 2316.

The scheduler 2230 may configure the ready output 2312 to be high whenever the input FIFO 2300, e.g., the HDL FIFO block 2316, is not full. The external memory may send the next data whenever this signal is high. This logic pushes values onto the FIFO whenever both the valid signal coming from the external memory is high and when the ready signal produced by this logic is high.

As indicated by AND block 2318, the input FIFO 2300 pops data whenever all of the following conditions are true: the FIFO is not empty, the FIFO "should pop" on this cycle, and the enable signal is high. As indicated by Delay block 2320, the input FIFO 2300 "should pop" on a particular cycle if either this logic got a "pop" signal from the sample-based algorithm on the cycle previous, or this logic got such a signal previously and did not yet have any data stored in the FIFO.

The scheduler 220 may configure the external delay input FIFO logic to produce an output indicating whether the streaming partition should be enabled on the next cycle, e.g. with an Enabled Subsystem. If the logic needs to pop a value that has not yet been received from the external memory, then the streaming partition cannot run on the next cycle. The logic may allow the streaming partition to run on the next cycle under several conditions. If a value does not need to be popped from the FIFO 2300 on the next cycle, as indicated by NOT block 2322, or if a value was not popped on this cycle and the FIFO is non-empty, as indicated by AND block 2324, or if a value was popped on this cycle and there is another value which will be available next cycle, as indicated by AND block 2326. If none of these conditions are met, then the data to run the streaming partition on the next cycle will not be available, and the streaming partition must be disabled until more data is received from the external memory.

In some cases, a function of a frame-based algorithm may include a persistent variable which is a variable whose value at the start of a function call to the function is the same as its value at the end of the last time the function is called. When translating this frame-based algorithm into samples, this persistent variable may be represented as a frame delay. The logic generator 218 may design and insert one or more storage elements, such as FIFOs, to implement this frame delay. FIFOs may be used if the data in the persistent variable has been converted to samples. The logic generator 218 may also add logic for emitting data samples once the corresponding sample from the next frame is received. For persistent variables that are not converted to samples, the logic generator 218 may utilize an enabled delay to hold the value of the persistent variable for a full frame. In some cases, the one or more FIFOs may be mapped to external memory.

It should be understood that the transformation engine 216 may use the same process to transform a reduction operation that iterates over an array value that has not been converted to samples by the transformation engine 216.

After transforming the hdl.iteratorfun iterator operation 1102, processing may return to step 538 as indicated by loopback arrow 548. The transformation engine 216 may determine if there is another reduction or iterator operation in the current partition to be transformed and, if so, transform that next reduction or iterator operation from operating on a frame to operating on a sample. For example, the transformation engine 216 may transform the hdl.iteratorfun of line 17 of the MATLAB code 1100, then the hdl.iteratorfun of line 24, and so on.

Structured Access Operation

Once the transformation engine 216 has transformed all of the reduction and iterator operations of the current partition from operating on frames to operating on samples, the transformation engine 216 may determine whether the current partition includes a structured access operation to be transformed, as indicated by No arrow 550 leading to step 552. If so, the transformation engine 216 may transform the structured access operation from operating on frames to operating on samples, as indicated by Yes arrow 554 leading to step 556.

A structured access operation is an operation performed on an entire input frame or a defined portion of an input frame. Typically, the locations of the elements within the frame that are to be processed, e.g., the pixels of an input image, are known. For example, an operation that applies a color filter on each color band of an input image based on threshold signals specific to each color input is an example of a structured access operation. A structured access is similar to a neighborhood operation, but typically does not include a sliding window.

The analyzer 212 may analyze the structured access operation and determine its parameters and functionality. For example, the analyzer 212 may determine the size of the input frame, the region of interest, the size of the thresholds or coefficients being applied, and the size of the output frame. For many structured access operations, the region of interest is the entire input frame.

The transformation engine 216 may transform the structured access operation to operate on samples. For example, the transformation engine 216 may replace frame-based operations, such as add, multiply, etc., in the in-memory IR with sample-based operations. The logic generator 218 may design and add counting logic configured to count the elements of the input frame and determine the location of the current element in the input frame. The transformation engine 216 also may add memory such as registers to store the thresholds or coefficients applied by the structured access operation. Because the operations performed on each element on the input frame are typically independent of the operations performed on the other elements of the input frame, the transformation engine 216 typically does not need to add memory for storing the input frame or any portions thereof.

Random Access Operation

After transforming the current structured access operation, processing may return to step 552 as indicated by loopback arrow 558. The transformation engine 216 may determine if there is another structured access operation in the current partition to be transformed and, if so, transform that next structured access operation from operating on a frame to operating on a sample. Once the transformation engine 216 has transformed all of the structured access operations of the current partition, the transformation engine 216 may determine whether the current partition includes a random access operation to be transformed, as indicated by No arrow 560 leading to step 562 (FIG. 5D) via GoTo and From steps 564 and 566. If so, the transformation engine 216 may transform the random access operation from operating on frames to operating on samples, as indicated by Yes arrow 568 leading to step 570.

A random access operation may be an operation that operates on one or more elements that may be located anywhere within a frame. For example, a random access operation may receive a location of one or more elements in the frame to be operated on, and the operation(s) to be performed on the one or more elements. Consider, for example, an operation that sets the values of pixels within a region of an input image to zero. The region may be defined by a starting row, an ending row, a starting column, and an ending column. The random access operation sets the pixels within that region to zero.

The analyzer 212 may identify such an operation in a frame-based model as a random access operation. The logic generator 218 may generate logic for counting the elements, e.g., pixels, in the input frame, e.g., image, as the elements are received at the random access operation. The transformation engine 216 may transform the function for setting pixel values to zero from operating on frames to operating on samples. The logic generator 218 may generate valid signal logic for activating the sample-based zeroing function only when the counting logic determines that the current pixel is within the region specified by the random access operation. The scheduler 220 may add data valid ports to the transformed random access operation.

In some cases, the elements to be operated on by a random access operation may not be known in advance. Instead, the elements may be determined programmatically and/or they may be specified by a user. For example, during execution, a frame-based model may determine which elements are to be processed by a random access operation. Alternatively or additionally, a user may specify the elements, e.g., as an input to the frame-based model. In this case, the logic generator 218 may design and add logic for determining or accessing the element locations to be processed by the random access operation. The logic generator 218 may then design and add logic for counting the elements of the input frame and determining when and element to be operated on is reached. The logic generator 218 also may generate logic for activating the sample-based function when the counting logic determines that the current element is to be processed by the random access operation.

In some embodiments, the logic generator 218 may logically construct a state machine, such as a finite state machine (FSM), among others, and add the state machine to the in-memory IR.

Figure 22:
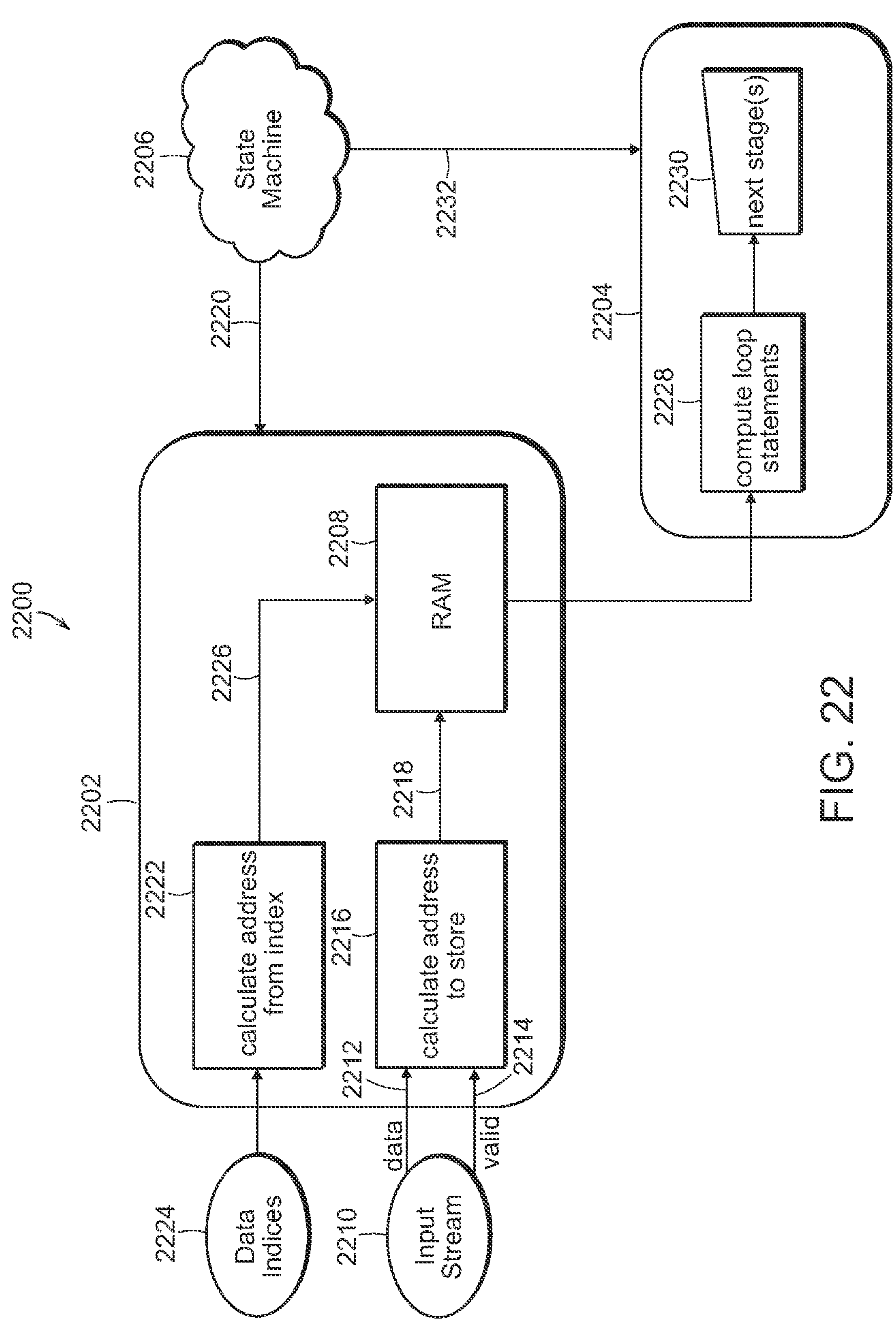
FIG. 22 is a schematic illustration of a sample-based implementation of a random access operation in accordance with one or more embodiments.

FIG. 22 is a schematic illustration of a sample-based implementation 2200 of a random access operation created by the logic generator 218 in accordance with one or more embodiments. The random access implementation 2200 may include two enabled subsystems 2202 and 2204 and a state machine 2206. The subsystem 2202 includes a random access memory (RAM) unit 2208, such as block RAM (BRAM) sized to hold an entire input frame. The subsystem 2202 receives an input stream 2210 that includes data 2212 and a valid signal 2214. The subsystem 2202 also includes logic 2216 configured to calculate addresses of the RAM unit 2208 at which input samples are to be stored, provided the valid signal 2214 indicates valid data, and for writing the input samples at the determined addresses, as indicated by write signal 2218. The state machine 2206 controls the enabled subsystem 2202 as indicated by control signal 2220. For example, the state machine 2206 may enable the subsystem 2202 until the entire frame is stored in the RAM unit 2208. The subsystem 2202 also includes logic 2222 that calculates an address in the RAM unit 2208 of a frame element based on a data index 2224, e.g., a random element or pixel of the input frame, received by the subsystem 2202. The logic 2222 may issue a read signal 2226 to the RAM for the frame element corresponding to the data index 2224. The RAM unit 2208 reads the element which is provided to the subsystem 2204.

The subsystem 2204 includes logic 2228 for performing the random access operation, e.g., a loop. The output of the logic 2228 may be provided to another portion of the frame-based algorithm as transformed to sample-based indicated at 2230. The state machine 2206 also may control the enabled subsystem 2204 as indicated by control signal 2232. For example, the state machine 2206 may only enable the subsystem 2204 after the entire frame is stored at the RAM unit 2208.

In some embodiments, the logic generator 218 may configure the state machine 2206 with using counters to count to the size of the frame and a comparator to check whether the counter is less than frame size for enabling storage of input. After this stage, the same counter may be reset to start again and count to the number of loop iterations. Until the number of loop iterations as determined using another comparator is reached, the state machine 2206 may enable the statements that compute the loop. Computing loop statements may read and write to the RAM created when storing the input frame.

After transforming the current random access operation, processing may return to step 562 as indicated by loopback arrow 572. The transformation engine 216 may determine if there is another random access operation in the current partition to be transformed and, if so, transform that next random access operation from operating on a frame to operating on a sample. Once the transformation engine 216 has transformed all of the random access operations of the current partition, processing may return to step 508 (FIG. 5A) as indicated by No arrow 574 and GoTo and From blocks 576 and 578. If the frame-based source program, e.g., the DUT 400, includes another partition, the frame transformation system 208 may transform the frame-based operations from frame-based to sample-based as described herein. If the frame-based source program does not include another partition to be processed, the scheduler 220 may add logic to the in-memory IR for generating and responding to the valid signals and connect the added logic to the valid ports previously added to the in-memory IR, as indicated by No arrow 580 (FIG. 5A) leading to step 582 (FIG. 5D) and GoTo and From blocks 584 and 586.

The scheduler 220 and/or the transformation engine 206 (as described) also may add logic to the in-memory IR for generating and responding to ready signals and connect the added logic to ready ports for the portions of the IR performing the sample-based operations, as indicated at step 583. The scheduler 220 may utilize a combination of Enabled Subsystems and FIFO buffers to implement a valid/ready interface. For example, on the input side, if there are more than one inputs to the partition, the scheduler 220 may collect valid signals for each input in an input FIFO. Once a valid sample for every input is stored at an input FIFO and the logic is ready to accept more inputs, the scheduler 220 may design and add logic for sending valid samples from the input FIFO to the algorithmic logic, which also may have the effect of aligning the input samples. On the output side, the scheduler 220 may design and add logic such that, if the ready signal provided by the downstream logic is low while valid samples are produced by the algorithmic logic, then the valid samples may be stored at an output FIFO. The scheduler 220 may also design and add logic such that, if the output FIFO is full, the partition may be disabled, e.g., using an Enabled Subsystem block, and logic for indicating that the input FIFO is not ready to accept more inputs. This logic may be provided at the DUT interface or, in other embodiments, it may be included within the DUT.

Figure 5E:
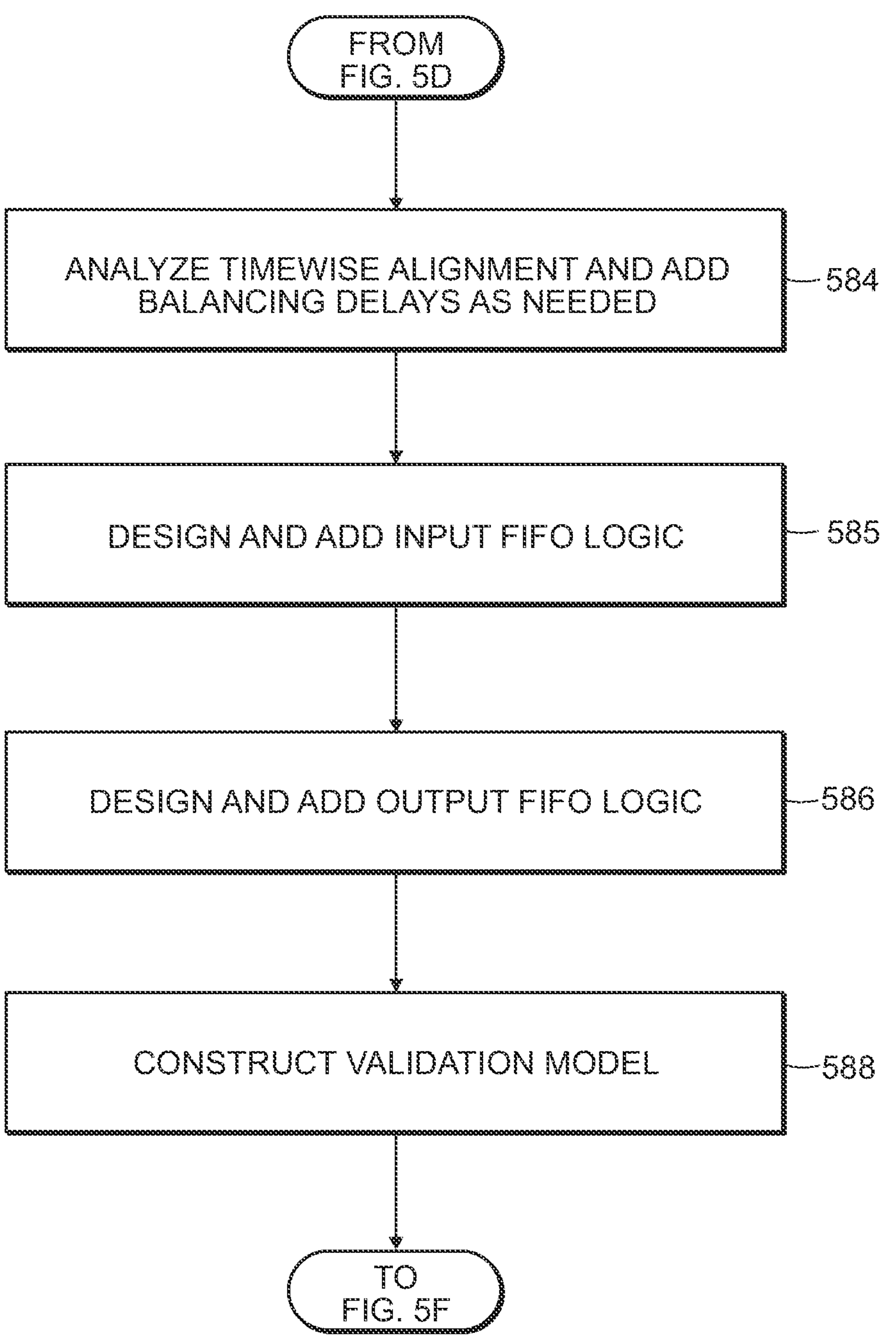

The delay balancing engine 222 may analyze the one or more sample-based in-memory IRs and add delay elements to ensure that the data, valid, and ready signals are timewise aligned, as indicated at step 584 (FIG. 5E). The delay balancing engine 222 may identify and balance cycles on which the input valid signal is high, as opposed to balancing absolute cycles. For example, a 3×3 neighborhood operation produces a delay of one line and two additional samples, because the neighborhood surrounding the top-left element, e.g., pixel, has its right and top sides defined by the boundary condition. If the user sends one line and one additional sample to the DUT, then the neighborhood operation will never produce a valid output, regardless of the number of cycles that pass, because it does not have enough valid inputs to generate a complete neighborhood. The delay balancing engine 222 may design and add different logic to balance different delay amounts. The delay balancing engine 222 may utilize FIFOs to balance delays identified on values converted to samples. Because the inputs to the DUT have been aligned, any value being balanced against the above 3×3 operation may need to store one line and two samples of valid data. This valid data may be pushed on to the FIFO using the balanced data's own valid signal, and the valid data may be popped from the FIFO using the valid signal associated with the data output from the neighborhood operation. For values that have not been converted to samples, e.g., arrays, the delay balancing engine 222 may not need to store this value on every cycle if these values are being held constant through the entire frame. In this case, the delay balancing engine 222 may use Delay blocks configured as enabled Delay blocks in order to store the value associated with the current frame. The delay balancing engine 222 also may determine how much memory is needed between two sources which have M and N cycles of delay on them.

For example, in row-major processing, a 3×5 neighborhood will produce a delay of one line and three samples, and a 5×3 neighborhood will produce a delay of two lines and two samples. If the outputs of these operations need to be balanced against each other, then the delay balancing engine 222 may place a FIFO on the output of the 3×5 operation so that its valid samples may be held until corresponding valid outputs of the 5×3 operation have been produced. The delay balancing engine 222 may determine how large of a FIFO to create in this case. One method to determine how much space is needed is simply to subtract the two delay amounts: (2 lines+2 samples)−(1 line+3 samples)=(1 line−1 sample). However, this method may cause failures because of end-of-line sample behavior in neighborhood operations. Because end-of-line neighborhoods contain boundary values, a neighborhood operation can produce a full line of valid output once it receives a full line of valid input. This means that once the neighborhood operations described above have received three full lines, the 3×5 neighborhood may produce two full lines of valid output, and the 5×3 neighborhood may have produced one full line of valid output. The difference between the outputs in this case is one full line, and the delay balancing engine 222 may use a FIFO size of one sample less than a full line. In general, the delay balancing engine 222 may generate FIFO sizes by subtracting "lines of delay" and "samples of delay" separately, and may not subtract the samples of delay if that difference is less than zero. So, in this case, because the two extra samples of delay on the slower path are less than the three samples of extra delay on the faster path, the delay balancing engine 222 may only use the line values and create a balancing FIFO with enough space to store one full line. The FIFOs designed and added by the delay balancing engine 222 are different from the input and output FIFOs described herein.

The scheduler 220 may design and add an input memory to the in-memory IR, such as an input First-In-First-Out (FIFO), as indicated at step 585.

Figure 15:
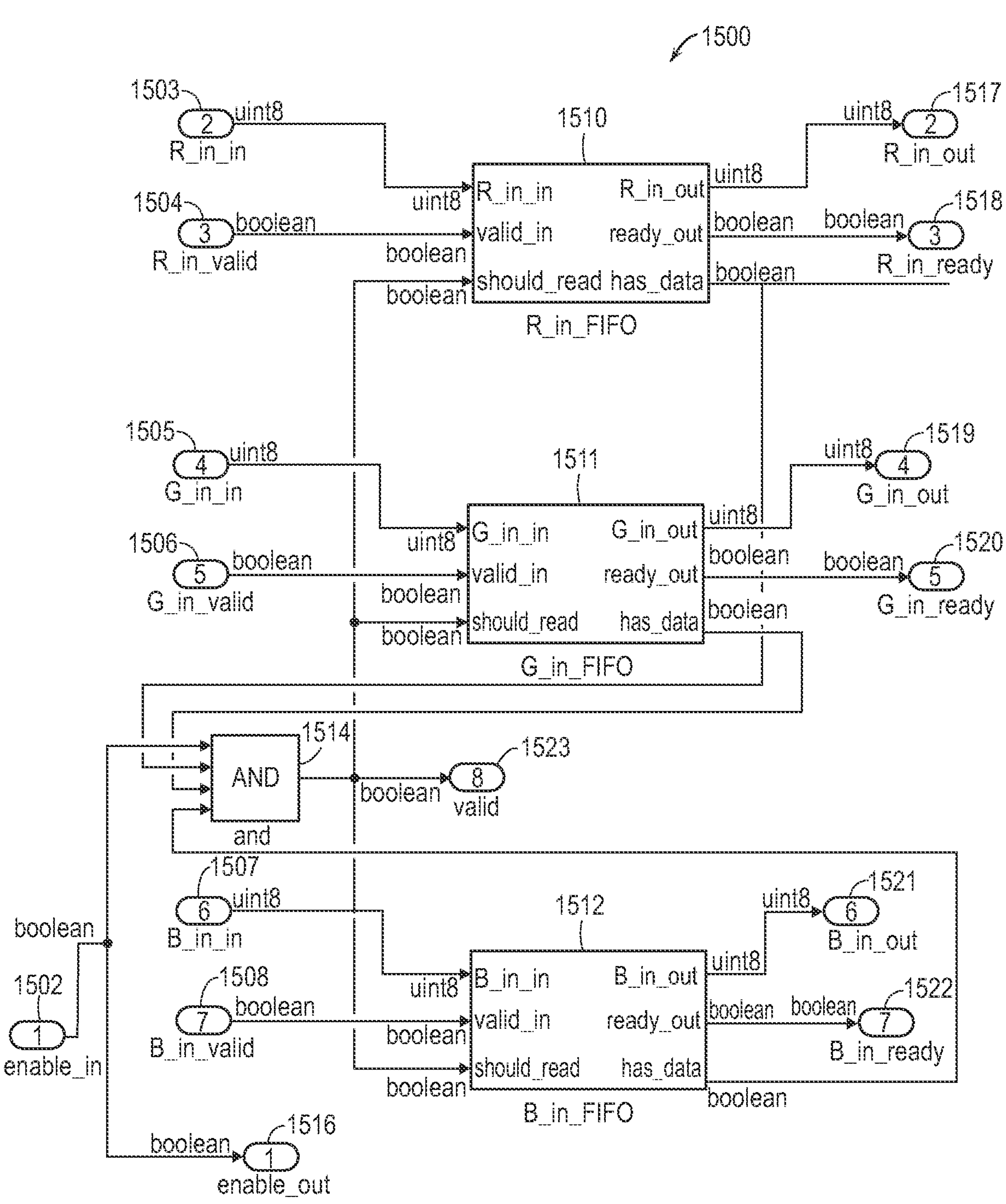
FIG. 15 is an illustration of an example input first-in-first-out (FIFO) in accordance with one or more embodiments.

FIG. 15 is an illustration of an example input FIFO 1500 in accordance with one or more embodiments. The input FIFO 1500 includes seven Inport blocks 1502-1508, three subsystem blocks 1510-1512 named 'R_in_FIFO', 'G_in_FIFO', and 'B_in_FIFO', a logical AND block 1514, and eight Outport blocks 1516-1523. The three subsystem blocks 1510-1512 include a memory structure for storing samples from an input frame, e.g., an input image. Each subsystem block 1510-1512 stores one or more samples for a different color channel. For example, the 'R_in_FIFO' subsystem 1510 stores samples for the Red (R) color channel, the 'G_in_FIFO' subsystem 1511 stores samples for the Green (G) color channel, and the 'B_in_FIFO' subsystem 1512 stores samples for the Blue (B) color channel.

Figure 16:
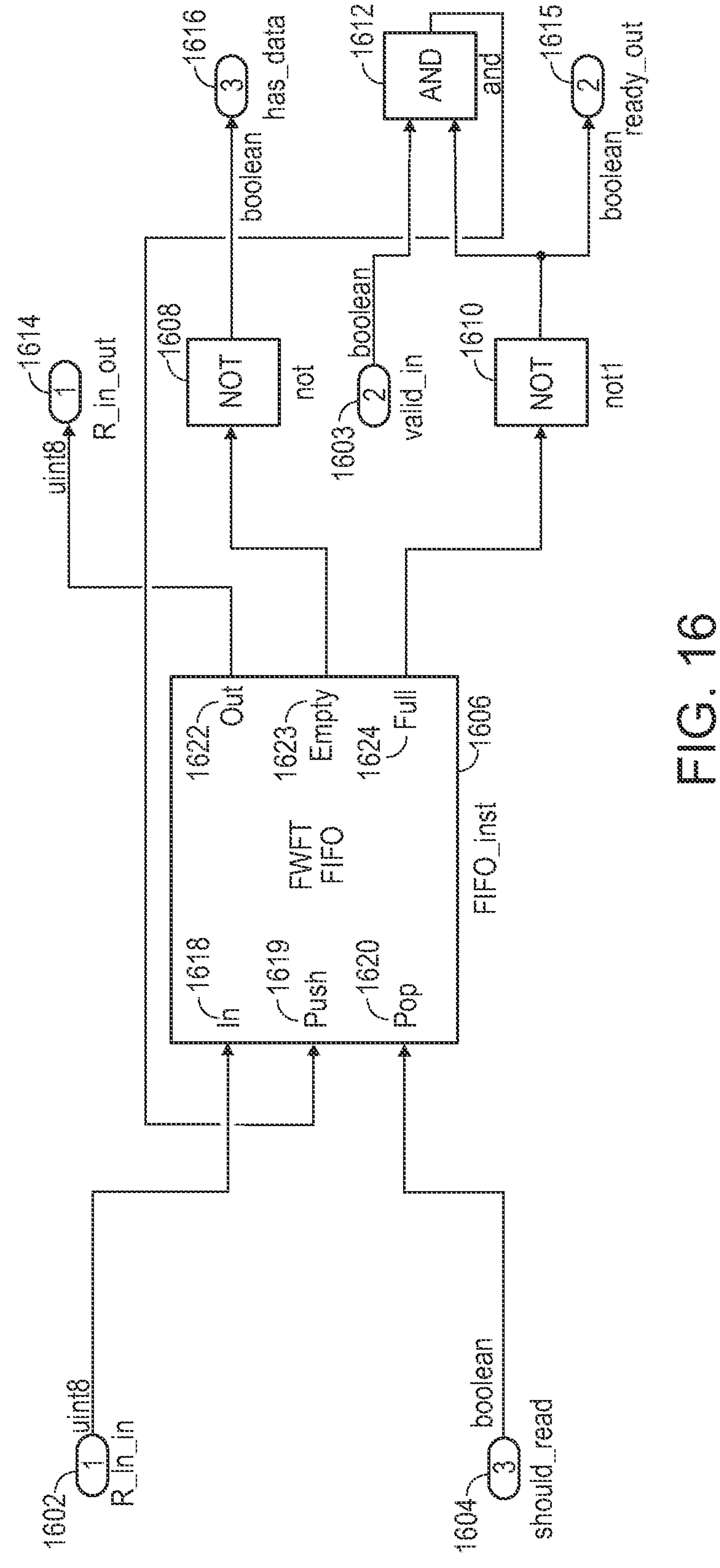
FIG. 16 is an illustration of an example of a portion the input FIFO of FIG. 15 in accordance with one or more embodiments.

FIG. 16 is an illustration of an example of the subsystem 1510 for the Red color channel as opened to show its contents in accordance with one or more embodiments. The 'R_in_FIFO' subsystem 1510 includes three Inport blocks 1602-1604 named 'R_in_in', 'valid_in', and 'should_read', an HDL FIFO block 1606, two logical NOT blocks 1608 and 1609, a logical AND block 1612, and three Outport blocks 1614-1616 named 'R_in_out', 'ready_out', and 'has_data'. The HDL FIFO block 1606 stores a sequence of input samples in a FIFO register, which may be implemented as a Dual Port RAM block. As illustrated in FIGS. 15 and 16, the data type of the samples input to the HDL FIFO block 1606 as received on the Inport block 1602 is 8-bit unsigned integer (uint8). The number of entries included in the HDL FIFO block 1606, and thus the number of samples that the HDL FIFO block 1606 may store, may be a user-settable parameter as indicated by numeric data entry box 614 (FIG. 6). A suitable number of entries is ten. The HDL FIFO block 1606 has three input ports 1618-1620 named 'In', 'Push', and 'Pop'. When the signal on the 'Push' input port 1619 is '1', then input data received on the 'In' input port 1618 may be pushed to the end of the FIFO register. The HDL FIFO blocks also includes three output ports 1622-1624 named 'Out', 'Empty', and 'Full'. When the signal on the 'Pop' input port 1620 is '1', the HDL FIFO block 1606 may pop the first sample off the FIFO register onto its 'Out' output port 1622. In some embodiments, the HDL FIFO block 1510 may be configured to operate in either a Classic FIFO mode or a first-word-fall-through (FWFT) mode. In FWFT the mode, a write operation works in the same way as in the Classic FIFO mode. The FWFT mode differs from the Classic mode when a read operation is performed. In the Classic mode, after placing a read request, e.g., inputting a '1' to the Pop input port 1620, the data becomes available at the Out output port 1622 in the next clock cycle. In the FWFT mode, the first word written to the HDL FIFO block 1606 falls through to the output, and is available at the Out output port 1622. The FWFT mode thus supports a lookahead to see the first word written to the FIFO register without placing a read request.

As described, the scheduler 220 may design and add an input FIFO, such as the input FIFO 1500 and additional logic, to buffer input data to be processed by the partitions of the transformed model component, e.g., DUT 400, to implement data ready signals for the partitions of the transformed model component and to pass the input data and ready signals to the partitions, to not pass input data to a partition if the partition is not ready to process additional data, to align the input data being provided to the partitions, and to prevent data from being provided if the FIFO is empty. The scheduler 220 may design and add logic to indicate a partition is not ready for date because an output FIFO is full, data has not been received by the partition from an external memory element, among other 'not ready' conditions that may occur at the partitions.

The 'enable_in' Inport block 1502 receives a signal indicating the output FIFO is not full and can receive data. The 'has_data' Outport blocks, e.g., block 1616, of the subsystem blocks 1510-1512 indicate that the HDL FIFO blocks, e.g., block 1606, have input data for the partitions. These signals are all provided to the AND block 1514 and thus all these signals must be True, e.g., high, (1) for the subsystems 1510-1512 to provide input data to the partitions, as illustrated by the 'should_read' signals to the 'Pop' inputs of the HDL FIFO blocks, e.g., block 1606, and (2) for the input FIFO 1500 to also provide a valid signal at 'valid' Outport block 1523.

Returning to FIG. 5E, the scheduler 220 also may design and add an output memory to the in-memory IR, such as an output FIFO, as indicated at step 586.

Figure 17:
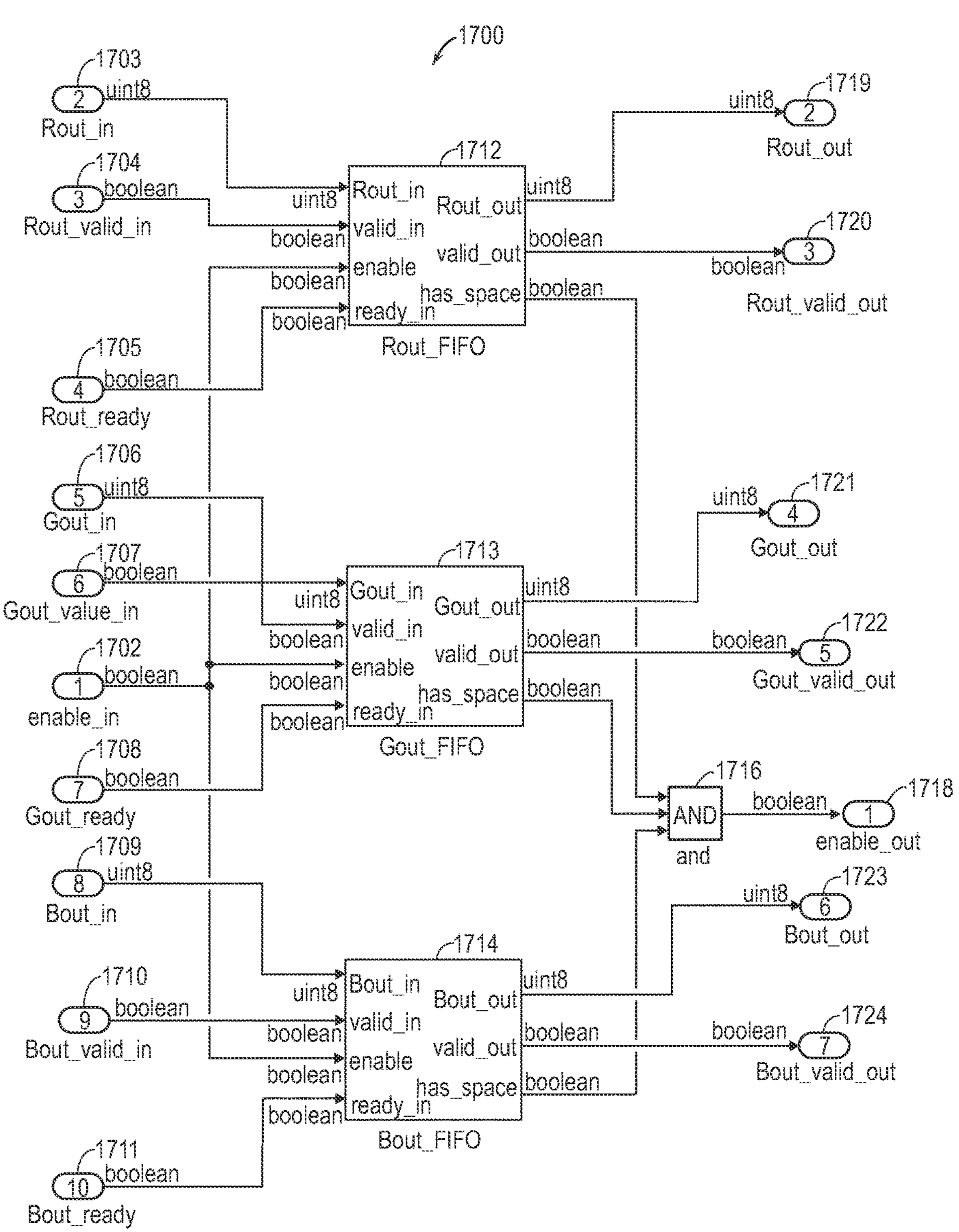
FIG. 17 is an illustration of an example output FIFO in accordance with one or more embodiments.

FIG. 17 is an illustration of an example output FIFO 1700 in accordance with one or more embodiments. The output FIFO 1700 includes ten Inport blocks 1702-1711, three subsystem blocks 1712-1714 named 'Rout_FIFO', 'Gout_FIFO', and 'Bout_FIFO', a logical AND block 1716, and seven Outport blocks 1718-1724. The three subsystem blocks 1712-1714 include a memory structure for storing samples for an output frame, e.g., an output image. Each subsystem block 1712-1714 stores one or more samples for a different color channel. For example, the 'Rout_FIFO' subsystem 1712 stores samples for the Red (R) color channel, the 'Gout_FIFO' subsystem 1713 stores samples for the Green (G) color channel, and the 'Bout_FIFO' subsystem 1714 stores samples for the Blue (B) color channel.

Figure 18:
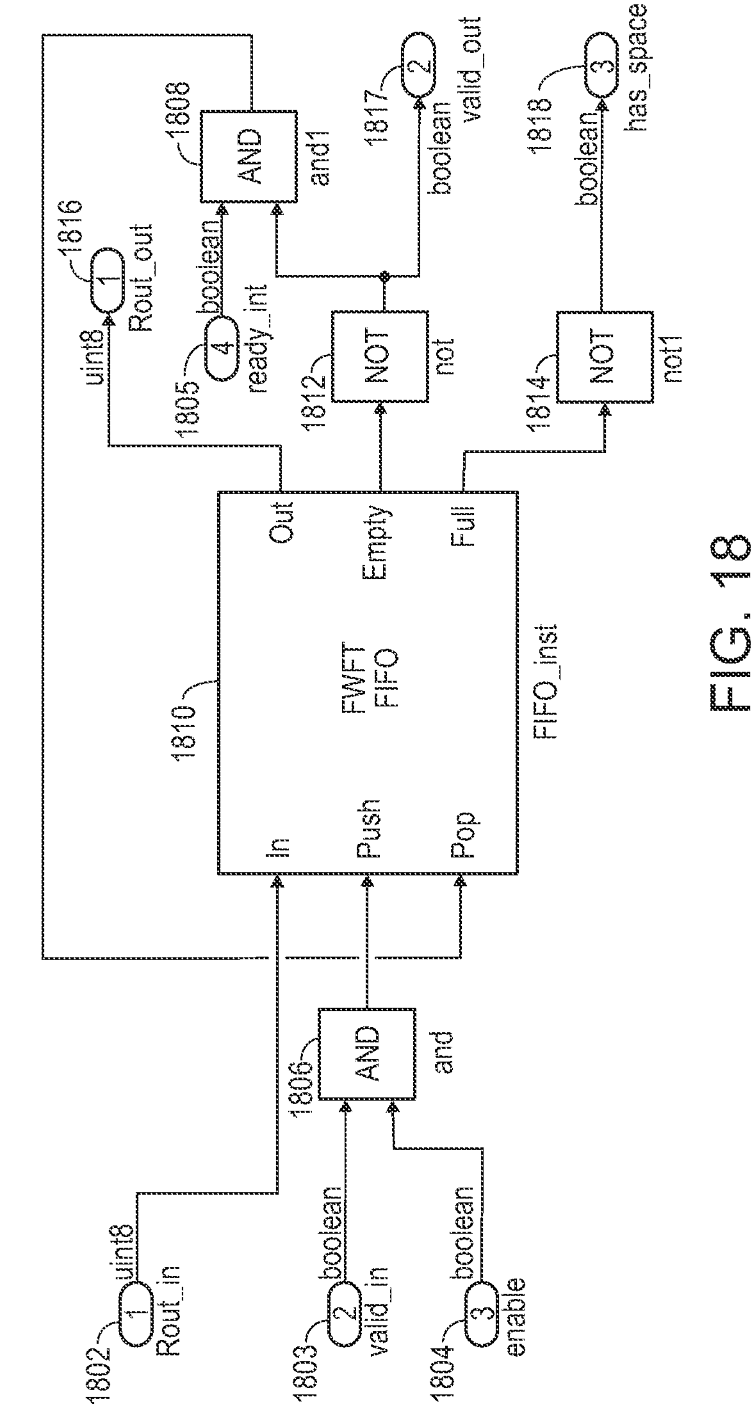
FIG. 18 is an illustration of an example of a portion of the output FIFO of FIG. 17 in accordance with one or more embodiments.

FIG. 18 is an illustration of an example of the subsystem 1712 for the Red color channel as opened to show its contents in accordance with one or more embodiments. The 'Rout_FIFO' subsystem 1712 includes four Inport blocks 1802-1805 named 'Rout_in', 'valid_in', 'enable', and 'ready_in', two logical AND blocks 1806 and 1808, an HDL FIFO block 1810, two logical NOT blocks 1812 and 1814, and three Outport blocks 1816-1818 named 'Rout_out', 'valid_out', and 'has_space'. The number of entries included in the HDL FIFO block 1710 may be configured based on the value entered at the numeric data entry box 616 (FIG. 6). Again, a suitable number of entries for the HDL FIFO block 1710 is ten.

As described, the scheduler 220 may design and add an output FIFO, such as the output FIFO 1700 and additional logic, to buffer only valid output data generated by the partitions of the transformed model component, e.g., DUT 400, and to only provide the valid output data, e.g., to other portions of the frame-based simulation model 300, in response to a ready signal.

If the ready signal received at an HDL FIFO block, e.g., block 1810, and the HDL FIFO block is not empty, then the HDL FIFO block pops a buffered value, as indicated by 'ready_in' Inport block 1805, NOT block 1812, and AND block 1808. If any of the HDL FIFO blocks are full, then the output FIFO 1700 signals the input FIFO 1500 that it is not ready for additional data, as indicated by the AND block 1716 and the 'enable_out' Output block 1718, which is connected to the 'enable_in' Inport block 1502 (FIG. 15) of the input FIFO 1500. The scheduler 220 also may use the 'enable_out' Output block 1718 to halt processing by the partitions, for example by utilizing Enabled subsystems for the partitions and the 'enable_out' signal as the control for the Enabled subsystems.

In some embodiments, the model generator 224 may construct the validation model 232 from the sample-based in-memory IR created for the DUT 400, as indicated at step 588. The UI engine 102 may present a visual depiction of the validation model 232 to the user, e.g., in a model editor window presented on a display.

Figure 19:
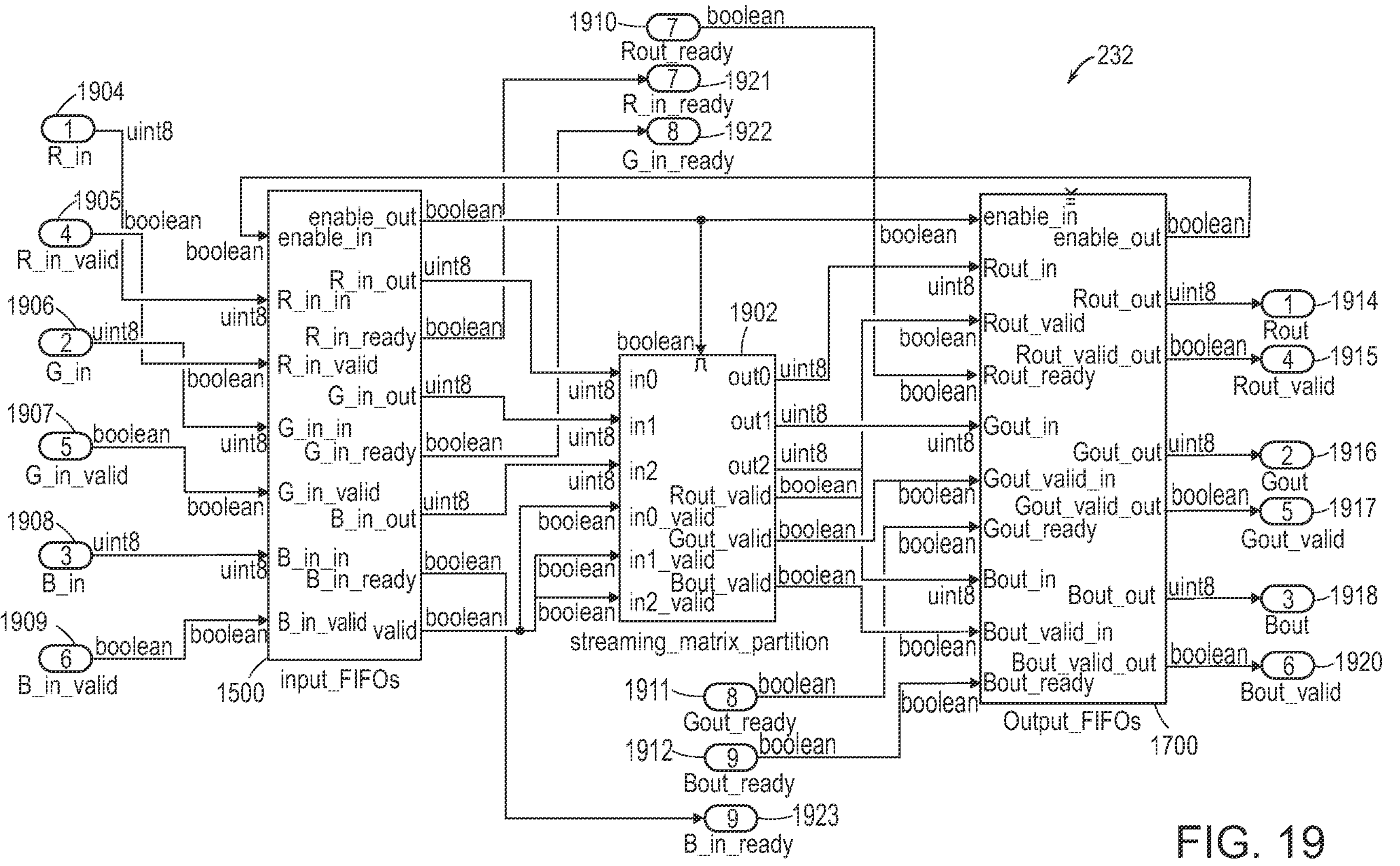
FIG. 19 is an illustration of an example of validation model in accordance with one or more embodiments.

FIG. 19 is an illustration of an example of the validation model 232 in accordance with one or more embodiments. The validation model 232 may include the input FIFO 1500, an enabled subsystem 1902 named 'streaming_matrix_partition', and the output FIFO 1700. The validation model also may include nine Inport blocks 1904-1912 named 'R_in', 'R_in_valid', 'G_in', 'G_in_valid', 'B_in', 'B_in_valid', 'Rout_ready', 'Gout_ready', and 'Bout_ready'. The validation model 232 also may include nine Outport blocks 1914-1923 named 'Rout', 'Rout_valid', 'Gout', 'Gout_valid', 'Bout', 'Bout_valid', 'R_in_ready', 'G_in_ready', and 'B_in_ready'.

Then enabled subsystem 1902 may contain the sample-based operations created by the frame transformation system 200, such as the Neighborhood Creator subsystem 802, the Neighborhood subsystem 804, etc.

Figure 5F:
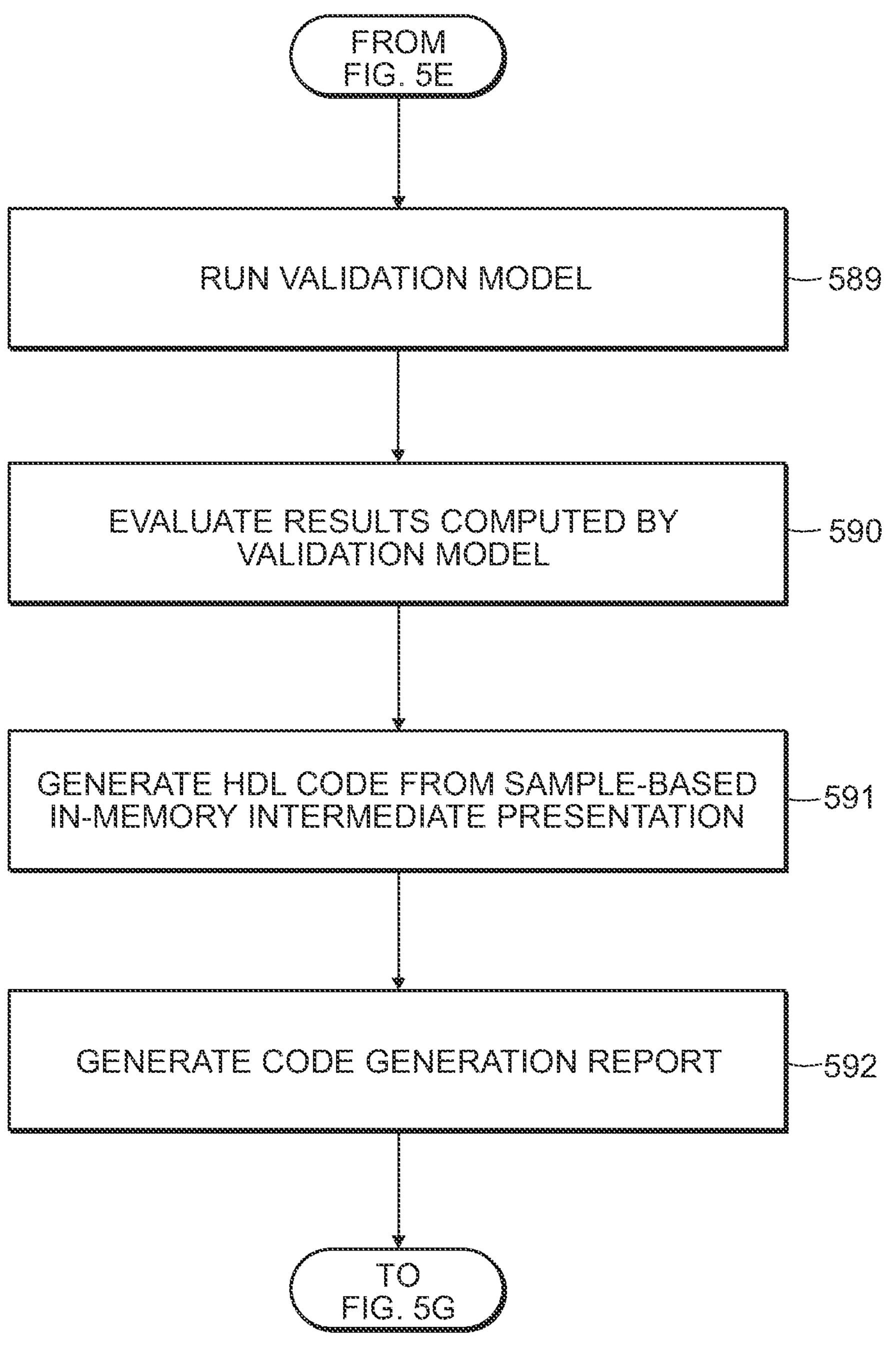

The validation engine 234, e.g., the simulation engine 108, may run the validation model 232 generating the validation results 236, as indicated at step 589 (FIG. 5F). In some embodiments, the frame-based model 300 and the validation model 232 may be included in a test harness model (not shown) which may provide the same input to both the frame-based model 300 and the validation model 232, and may compare the outputs computed by the frame-based model 300 with the outputs computed by the validation model 232. The validation results 236 computed by the validation model 232 may be evaluated, as indicated at step 590. For example, a user may determine whether the validation results 236 computed by the validation model 234 are the same as the outputs computed by the frame-based model 300.

The simulation time needed to compute the output image by the sample-based validation model 232 will be longer than the simulation time needed to compute the output image by the frame-based model 300. This addition time may be referred to as latency. The latency to process a valid output element, e.g., pixel, for a valid input element, e.g., pixel, from the input frame may depend on the size of the input image, the samples per cycle, and the algorithm implemented by the frame-based model 300.

The amount of time that it takes for a valid output pixel to be produced may be a combination of a constant number of latency cycles, for example, if the output sample, e.g., pixel, has gone through pipelined operations, as well as a number of cycles of valid pixels. For example, if an output pixel is produced from an operation that requires a 3×3 window, the algorithm may not produce a valid output pixel until more than a full line of valid input pixels have been provided. Note: for a 3×3 window, one line plus two samples, e.g., pixels, are needed.

The back-end processing unit 206 may generate code, such the generated HDL code 228, from the sample-based in-memory IR, as indicated at step 591. In some embodiments, the report generator 210 may generate one or more reports, such as the code generation report 230, as indicated at step 592. The code generation report 230 may be presented to the user, e.g., it may be presented on a display. The code generation report 230 may include information about the frame-to-sample transformation, such as which inputs and outputs were converted to samples, which valid and ready signals are associated with which inputs/outputs, and the number, required size, and associated ports of any external memory ports that were generated. The report 230 may also include a summary of the user-provided parameters that were selected prior to code generation.

Figure 5G:
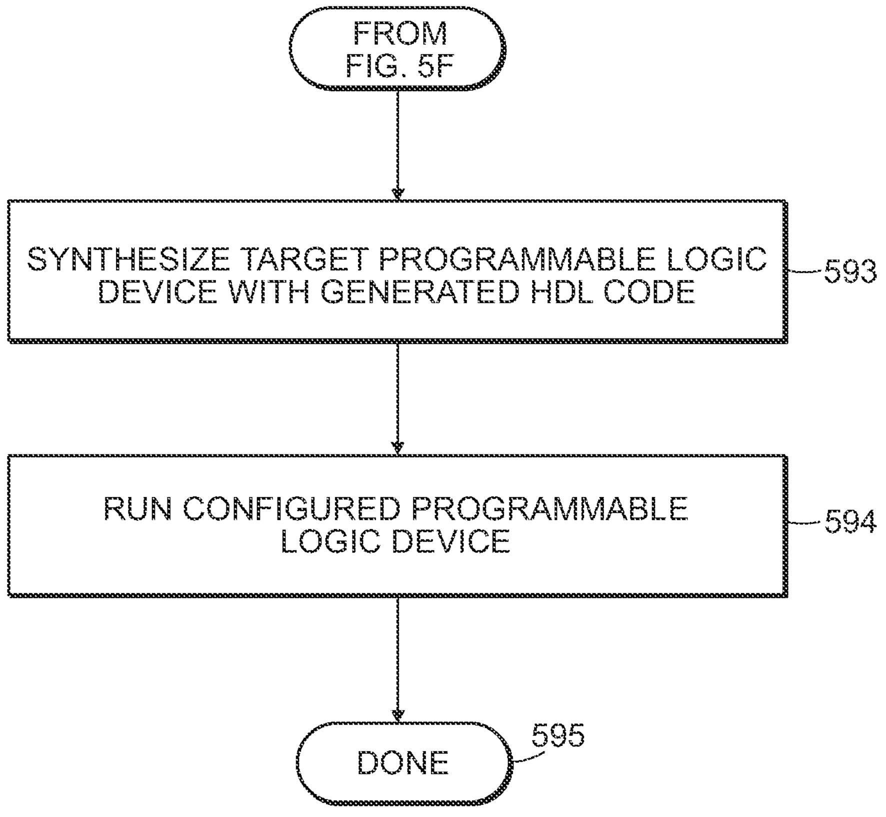

In some embodiments, the hardware synthesis tool 112 may utilize the generated HDL code 228 to synthesize, e.g., configure, the target programmable logic device, as indicated at step 593 (FIG. 5G). The synthesized programmable logic device may then be run, implementing the functionality of the frame-based model 300 in hardware, as indicated at step 594. Processing may then be complete as indicated by Done block 595.

Frame to Multiple Samples

As described herein, the frame transformation system 208 may transform a frame-based algorithm, e.g., the frame-based model 300, to operate on samples. For example, the frame transformation system 208 may transform a frame-based algorithm to operate on one sample per clock cycle by setting the 'Samples per cycle' numeric data entry box 612 (FIG. 6) to '1'. As transformed, the algorithm's operations may operate on one sample, e.g., one frame element, per clock cycle. In some embodiments, the frame transformation system 208 may transform a frame-based algorithm so that one or more of the operations operate on multiple samples per clock cycle. For example, a user may set the 'Samples per cycle' numeric data entry box 612 to some integer value greater than '1', such as '4'. In response, the frame transformation system 208 may transform the frame-based algorithm or a portion thereof to operate on four samples of an input frame per clock cycle.

In some embodiments, the logic generator 218 may modify the in-memory IR by duplicating the logic that was generated for computing one sample. For example, for an element-wise operation, such as a Gain block, the logic generator 218 may generate four Gain blocks each operating on one of the four samples. For a neighborhood operation, the logic generator 218 may generate four neighborhood creator subsystems and four neighborhood subsystems each operating on one of the four samples. Similarly, for the other types of operations, the logic generator 218 may duplicate the logic so there is one set of logic for processing each sample. The logic generator 218 may also add one or more Demux blocks to extract the individual elements from the four element vector input to the operation and route each extracted element to one of the four instantiations of the logic generated for performing the operation on a sample. The logic generator 218 also may add one or one Concatenate blocks to aggregate the outputs of the four operations into a four-element vector output by the operation.

In some embodiments, the code generation system 200 may apply one or more optimizations to the final sample-based in-memory IR generated by the frame transformation system 208. For example, the code generation system 200 may apply a resource sharing optimization as described in U.S. Pat. No. 8,694,947 for Resource Sharing Workflows within Executable Graphical Models.

Mixed Frame/Scalar Operations

In some embodiments, a frame-based model may include one or more inputs, which are not converted to samples, as well as one or more frame-based based inputs. The frame transformation system 208 may combine these inputs with frame-based inputs, for example as threshold values, gain or bias values, or some other kind of value that does not change throughout a frame. The transformation system 208 may design and insert logic to ensure that these values are held steady throughout the processing of the frames with which they are associated.

Multi-Target Support

In some embodiments, the user may identify the parts of the frame-based model and/or DUT that are not to be transformed by the frame transformation system 208. Code for the parts of the frame-based model and/or DUT not transformed to sample-based may be generated and deployed to a Central Processing Unit (CPU) or Graphics Processing Unit (GPU), e.g., using code generation tools such as the Embedded Coder and GPU Coder tools from The Math Works, Inc. The logic generator 218 and the delay balancing engine 222 may generate logic for aligning and synchronizing signals between the sample-based portions and the frame-based portions that will be running on the CPU/GPU. The scheduler 220 may generate control signals, such as valid/ready signals for external system handshakes with the frame-based portions that will be running on the CPU/GPU. The frame transformation system 208 also may generate control logic for buffering data to be sent to processing elements, e.g., CPU and/or GPU, having larger memory than the programmable logic element. In other cases, the user may manually revise the frame-based parts of the model or DUT to support the generation of synthesizable HDL code.

In some embodiments, a frame-based algorithm may include one or more frame-based regions and one or more sample-based regions. For a frame-based region connected to a sample-based region, the model may include logic that translates the frame to samples. For a sample-based region connected to a frame-based region, the model may include logic that translates the samples to a frame. The frame transformation system 208 may transform the frame-based regions to sample-based algorithms as described herein and may remove the frame to sample logic and the sample to frame logic.

Three-Dimensional (3D) Frames

The frame transformation system 212 may transform frame-based algorithms operating on three-dimensional (3D) frames (in addition to two-dimensional frames). The frame transformation system 212 may generate a sample-based algorithm in which each sample includes the elements along the third dimensions of the 3D frame. For example, suppose the an input frame processed by a frame-based algorithm is an 1920×1080 with Red, Green, Blue color channels. The frame size is 1920×1080×3. The frame transformation system 212 may generate a sample-based algorithm where each sample is 1×1×3, e.g., a row vector with all three color channels (R, G, B). The frame transformation system 212 may design the logic of the partitions as described herein except instead of operating on one element, the logic operates on this row vector sample, i.e., 1×1×3.

In cases where the user has selected to process more than one element of the input matrix on each cycle, the sample size may be extended along either the row or column dimension. This may be related to the user-selected "Input processing order," which may be either row- or column-major. If the user selects row-major input processing and two samples per cycle, then the sample size may be set at 1×2×3, i.e., a set of 3 row vectors concatenated along the third dimension. Similarly, if the user selects column-major input processing order, then the sample size may be 2×1×3, i.e., a set of 3 column vectors concatenated along the third dimension.

In some embodiments, a user may indicate that input frames should be split and/or concatenated the third dimension. In response, the frame transformation system 208 may transform each split portion or concatenated portion of the input frame to a sample-based algorithm. For example, suppose the frame-based algorithm processes an RGB image, extracts the green layer, and performs a computation on it. The frame-based algorithm may indicate this by using a Selector block in the frame-based model, configured as "Select all" in the first two dimensions and selecting element 2 in the third dimension. For an input frame of size 1920×1080×3, this would produce a 1920×1080 green layer. In the sample-based implementation, the logic generator 218 may support this operation by producing logic which selects the second element of the 1×1×3 sample, a scalar value.

Exemplary Data Processing Device

Figure 20:
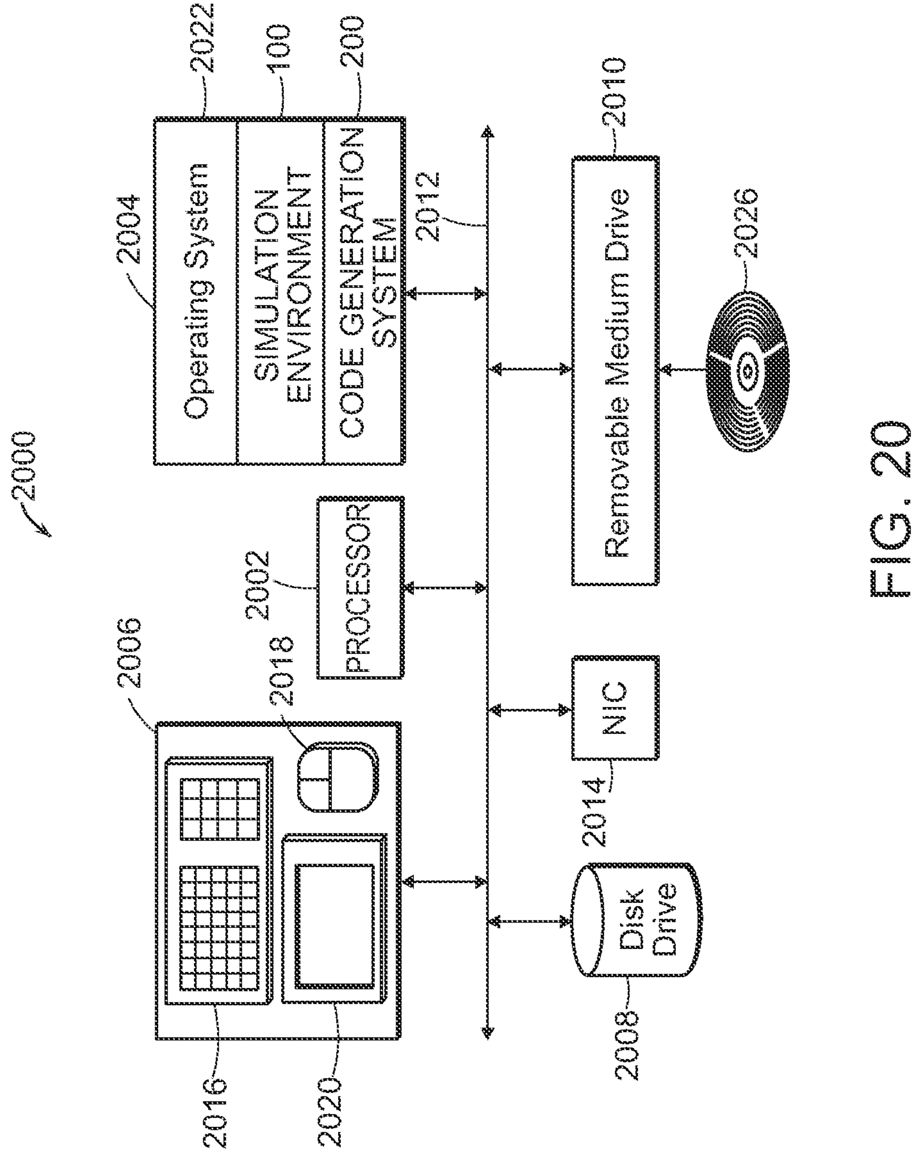
FIG. 20 is a schematic illustration of an example computer or data processing system for implementing one or more embodiments of the present disclosure.

FIG. 20 is a schematic illustration of an example computer or data processing system 2000, such as the data processing device 204, for implementing one or more embodiments of the present disclosure. The computer system 2000 may include one or more processing elements, such as a processor 2002, a main memory 2004, user input/output (I/O) 2006, a persistent data storage unit, such as a disk drive 2008, and a removable medium drive 2010 that are interconnected by a system bus 2012. The computer system 2000 may also include a communication unit, such as a network interface card (NIC) 2014. The user I/O 2006 may include a keyboard 2016, a pointing device, such as a mouse 2018, and a display 2020. Other user I/O 2006 components include microphones, speakers, voice or speech command systems, touchpads and touchscreens, wands, styluses, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 2004, which may be a Random Access Memory (RAM), may store a plurality of program libraries or modules, such as an operating system 2022, and one or more application programs that interface to the operating system 2022, such as the simulation environment 100 and the code generation system 200.

The removable medium drive 2010 may accept and read a computer readable medium 2026, such as a CD, DVD, floppy disk, solid state drive, tape, flash memory or other non-transitory medium. The removable medium drive 2010 may also write to the computer readable medium 2026.

Suitable computer systems include personal computers (PCs), workstations, servers, laptops, tablets, palm computers, smart phones, electronic readers, and other portable computing devices, etc. Nonetheless, those skilled in the art will understand that the computer system 2000 of FIG. 20 is intended for illustrative purposes only, and that the present disclosure may be used with other computer, data processing, or computational systems or devices. The present disclosure may also be used in a computer network, e.g., client-server, architecture, or a public and/or private cloud computing arrangement. For example, the deep learning configuration system 200 may be hosted on one or more cloud servers or devices, and accessed by remote clients through a web portal or an application hosting system.

Suitable operating systems 2022 include the Windows series of operating systems from Microsoft Corp. of Redmond, WA, the Android and Chrome OS operating systems from Google Inc. of Mountain View, CA, the Linux operating system, the MAC OS® series of operating systems from Apple Inc. of Cupertino, CA, and the UNIX® series of operating systems, among others. The operating system 2022 may provide services or functions for applications or modules, such as allocating memory, organizing data objects or files according to a file system, prioritizing requests, managing I/O, etc. The operating system 2022 may run on a virtual machine, which may be provided by the data processing system 2000.

As indicated above, a user, such as an engineer, scientist, programmer, developer, etc., may utilize one or more input devices, such as the keyboard 2016, the mouse 2018, and the display 2020 to operate the simulation environment 100 and/or the code generation system 200.

Figure 21:
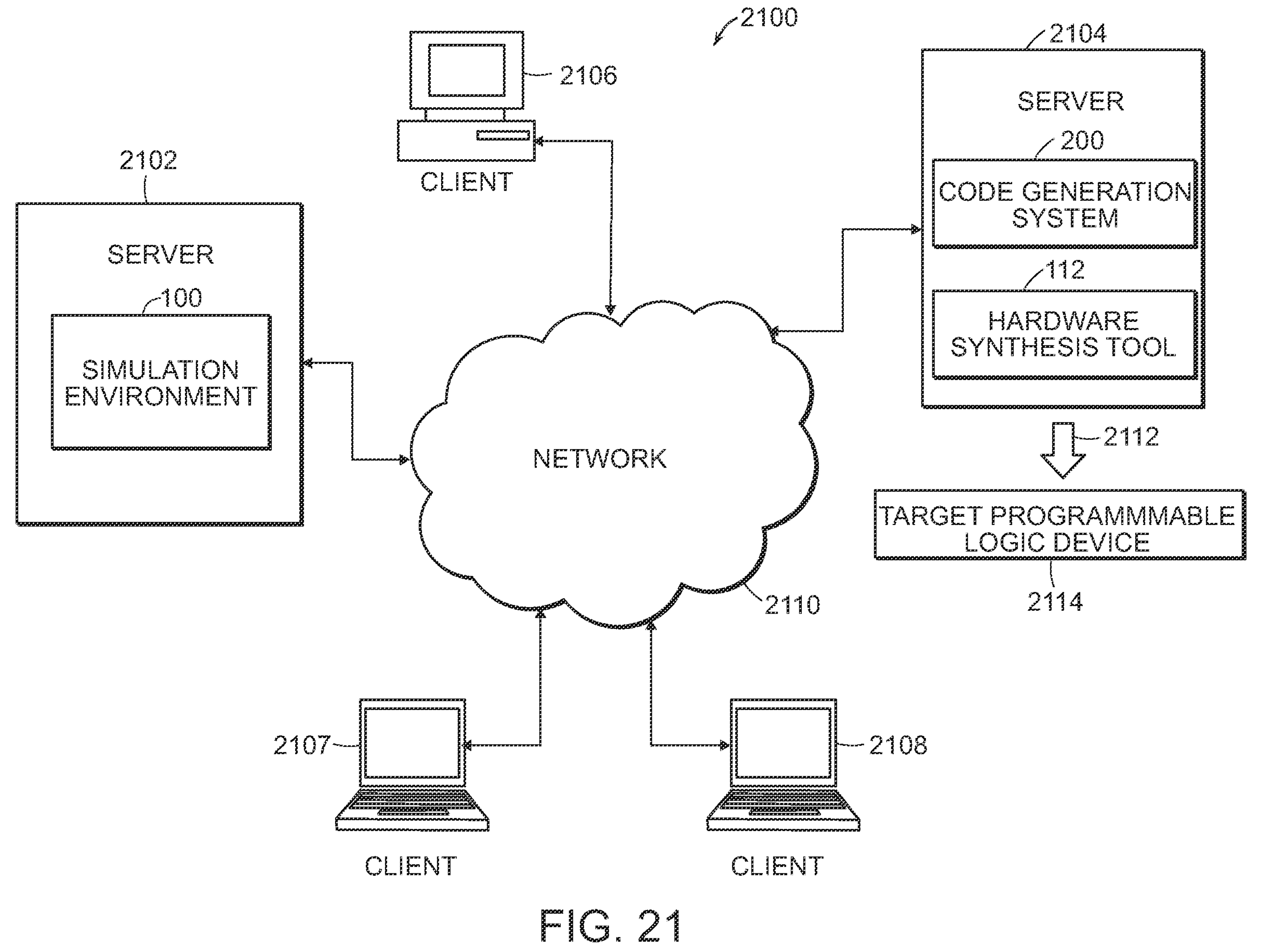
FIG. 21 is a schematic diagram of an example distributed computing environment in which systems and/or methods described herein may be implemented.

FIG. 21 is a schematic diagram of an example distributed computing environment 2100 in which systems and/or methods described herein may be implemented. The environment 2100 may include client and server devices, such as two servers 2102 and 2104, and three clients 2106-2108, interconnected by one or more networks, such as network 2110. The servers 2102 and 2104 may include applications or processes accessible by the clients 2106-2108. For example, the server 2102 may run the simulation environment 100. The server 2104 may run the code generation system 200 and the hardware synthesis tool 112. The devices of the environment 2100 may interconnect via wired connections, wireless connections, or a combination of wired and wireless connections.

The hardware synthesis tool 112 may synthesize, as indicated by arrow 2112, at least a portion of a target programmable logic device 2114. The target programmable logic device 2114 may be and/or may be included in an embedded system that may be a deployed as a product or system. Exemplary target programmable logic devices include FPGA boards from Intel Corp. of Santa Clara, CA and Xilinx, Inc. of San Jose, CA.

The servers 2102 and 2104 may include one or more devices capable of receiving, generating, storing, processing, executing, and/or providing information. For example, the servers 2102 and 2104 may include a computing device, such as a server, a desktop computer, a laptop computer, a tablet computer, a handheld computer, or a similar device.

The clients 2106-2108 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 2106-2108 may download data and/or code from the servers 2102 and 2104 via the network 2110. In some implementations, the clients 2106-2108 may be desktop computers, workstations, laptop computers, tablet computers, handheld computers, mobile phones (e.g., smart phones, radiotelephones, etc.), electronic readers, or similar devices. In some implementations, the clients 2106-2108 may receive information from and/or transmit information to the servers 2102 and 2104.

The network 2110 may include one or more wired and/or wireless networks. For example, the network 2110 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The number of devices and/or networks shown in FIG. 21 is provided as an example. In practice, there may be additional devices and/or networks, fewer devices and/or networks, different devices and/or networks, or differently arranged devices and/or networks than those shown in FIG. 21. Furthermore, two or more devices shown in FIG. 21 may be implemented within a single device, or a single device shown in FIG. 21 may be implemented as multiple, distributed devices. Additionally, one or more of the devices of the distributed computing environment 2100 may perform one or more functions described as being performed by another one or more devices of the environment 2100.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

In some embodiments, a user may interact with one or more of the simulation environment 100 and/or the code generation system 200 using spoken commands that may be input to the data processing system 1100 through a microphone or by using eye, hand, facial, or other body gestures that may be input to the data processing system 2000 through a camera. In addition, auditory outputs may be generated by one or more of the simulation environment 100 and/or the code generation system 200 additionally or alternatively to graphically and textually presented outputs, and the auditory outputs may be presented to the user through a speaker.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. Therefore, it is the object of the appended claims to cover all such variations and modifications as come within the true spirit and scope of the disclosure.

What is claimed is:

1. A computer-implemented method comprising:

accessing an executable simulation model configured to receive frame-based input data, wherein the executable simulation model includes (i) one or more frame-based signals having a datatype and a rate and (ii) a component configured to perform one or more frame-based operations and produce frame-based output data, the component performing at least one of an elementwise operation, a neighborhood operation, a reduction operation, an iteration operation, a structured access operation, or a random access operation;

generating, by one or more processors, hardware description language (HDL) code for the executable simulation model, wherein the generating the HDL code includes:

updating the datatype of the one or more frame-based signals to a new datatype;

updating the rate of the one or more frame-based signals to a new rate;

converting the frame-based input data to streaming input data;

converting the frame-based output data to streaming output data;

converting the one or more frame-based signals to one or more streaming signals;

converting the component performing the at least one of the elementwise operation, the neighborhood operation, the reduction operation, the iteration operation, the structured access operation, or the random access operation to a sample-based implementation operating on the one or more streaming signals;

inserting first logic for generating a ready signal indicating the converted component is ready to process input data;

inserting second logic for generating a data valid signal indicating output data computed by the converted component is valid;

adding an input buffer and an output buffer;

configuring the input buffer to receive the streaming input data and to provide the streaming input data to the converted component in response to the ready signal; and configuring the output buffer to store the output data in response to the data valid signal and to provide the output data as the streaming output data.

2. The computer-implemented method of claim 1 wherein the new datatype and the new rate are based on a samples per hardware execution cycle parameter.

3. The computer-implemented method of claim 1 wherein the component performs the neighborhood operation and the neighborhood operation defines a neighborhood and a filter, the method further comprising:

inserting third logic for counting elements of the streaming input data to construct the neighborhood at the converted component.

4. The computer-implemented method of claim 1 wherein the executable simulation model includes (i) a second component configured to perform one or more second frame-based operations and produce second frame-based output data and (ii) one or more second frame-based signals having a second datatype and a second rate, the method further comprising:

creating separate partitions for the component and the second component; updating the second datatype of the one or more second frame-based signals to a new second datatype based on a samples per hardware execution cycle parameter;

updating the second rate of the one or more second frame-based signals to a new second rate as a function of the samples per hardware execution cycle parameter;

converting the one or more second frame-based signals to one or more second streaming signals;

converting the second component to a sample-based implementation;

inserting second logic associated with the second component, wherein the second logic is configured to (i) buffer second data from the one or more streaming signals and (ii) process one or more valid signals; and connecting the one or more valid signals of the inserted second logic to the second component.

5. The computer-implemented method of claim 1 wherein the input buffer and the output buffer are First In First Out (FIFO) buffers.

6. The computer-implemented method of claim 1 wherein the executable simulation model performs image processing and the frame-based input data is at least one of 240×320 pixels, 640×480 pixels, 1280×720 pixels, 1920×1080 pixels, 3840×2160 pixels, 4096×2160 pixels, or 7680×4320 pixels.

7. The computer-implemented method of claim 1 wherein the frame-based input data is one-dimensional (1D) vector data, two-dimensional (2D) matrix data, or multi-dimensional matrix data.

8. The computer-implemented method of claim 1 wherein the executable simulation model performs signal processing on wireless signals, radar signals, or lidar signals.

9. The computer-implemented method of claim 1 further comprising:

utilizing the generated HDL code to synthesize a programmable logic device.

10. The computer-implemented method of claim 9 wherein the programmable logic device has Input-Output (IO) resources and a size of the frame-based input data exceeds the IO resources of the programmable logic device.

11. The computer-implemented method of claim 10 wherein a size of the one or more streaming signals is within the IO resources of the programmable logic device.

* * * * *